(12) United States Patent
Chao et al.

(10) Patent No.: US 12,222,638 B2
(45) Date of Patent: Feb. 11, 2025

(54) OPTICAL ELEMENT DRIVING MECHANISM

(71) Applicant: TDK Taiwan Corp., Taoyuan (TW)

(72) Inventors: Chen-Hung Chao, Taoyuan (TW);
Yi-Chieh Lin, Taoyuan (TW);
Tsung-Han Wu, Taoyuan (TW);
Shou-Jen Liu, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 611 days.

(21) Appl. No.: 17/540,721

(22) Filed: Dec. 2, 2021

(65) Prior Publication Data

US 2022/0182515 A1     Jun. 9, 2022

Related U.S. Application Data

(60) Provisional application No. 63/121,415, filed on Dec. 4, 2020.

(51) Int. Cl.
| | |
|---|---|
| *G03B 9/40* | (2021.01) |
| *G01D 5/14* | (2006.01) |
| *G02B 7/02* | (2021.01) |
| *G02B 7/09* | (2021.01) |
| *G02B 26/08* | (2006.01) |
| *G03B 9/10* | (2021.01) |
| *H01F 7/08* | (2006.01) |
| *H01F 7/16* | (2006.01) |
| *H04N 23/54* | (2023.01) |
| *H04N 23/55* | (2023.01) |

(52) U.S. Cl.
CPC .................. *G03B 9/40* (2013.01); *G01D 5/14* (2013.01); *G02B 7/02* (2013.01); *G02B 7/09* (2013.01); *G02B 26/08* (2013.01); *G03B 9/10* (2013.01); *H01F 7/081* (2013.01); *H01F 7/16* (2013.01); *H04N 23/54* (2023.01); *H04N 23/55* (2023.01)

(58) Field of Classification Search
CPC ... G03B 9/40; G03B 9/10; G03B 9/14; G03B 30/00; G03B 2205/0069; G03B 5/00; G03B 3/10; G03B 13/36; G01D 5/14; G02B 7/02; G02B 7/09; G02B 26/08; G02B 5/005; G02B 26/02; G02B 7/00; G02B 27/646; G02B 7/08; G02B 7/04; G02B 7/023; H01F 7/081; H01F 7/16; H01F 7/14; H04N 23/54; H04N 23/55; H04N 23/57; H04N 23/687
See application file for complete search history.

(56) References Cited

U.S. PATENT DOCUMENTS

| 2013/0089311 A1* | 4/2013 | Jung | H04N 23/687 |
|---|---|---|---|
| | | | 396/55 |
| 2016/0070270 A1* | 3/2016 | Beard | G02B 27/646 |
| | | | 318/647 |

(Continued)

*Primary Examiner* — Darryl J Collins
*Assistant Examiner* — Matthew Y Lee
(74) *Attorney, Agent, or Firm* — MUNCY, GEISSLER, OLDS & LOWE, P.C.

(57) ABSTRACT

An optical element driving mechanism is provided, including a movable part, a fixed part, and a driving assembly. The movable part is for connecting the optical element. The movable part is movable relative to the fixed part. The driving assembly is used for generating a driving force to drive the movable part to move relative to the fixed part. The driving assembly further includes a first reinforcement element, for strengthening the driving force.

19 Claims, 15 Drawing Sheets

(56) References Cited

U.S. PATENT DOCUMENTS

2016/0329801 A1\* 11/2016 Hu ........................... G02B 7/09
2018/0372988 A1\* 12/2018 Hu ........................... G02B 7/09
2020/0400915 A1\* 12/2020 Ito ...................... G02B 23/2476

\* cited by examiner

OPTICAL ELEMENT DRIVING MECHANISM

CROSS REFERENCE TO RELATED APPLICATIONS

This application claims the benefit of U.S. Provisional Application No. 63/121,415, filed 4 Dec. 2020, the entirety of which is incorporated by reference herein.

BACKGROUND OF THE INVENTION

Field of the Invention

The present disclosure relates to an optical element driving mechanism, and more particularly to an optical element driving mechanism of an electrical device.

Description of the Related Art

As the relevant technologies have developed, many electronic devices (such as computers and tablets) are equipped with the capability to record images and videos. However, when an optical element (such as lens) having a long focal length is provided in an electronic device, the thickness of the electronic device may be increased, impeding the prospects for miniaturization of the electronic device. Therefore, how to design an optical element driving mechanism and an optical device that may miniaturize the electronic device has become an important issue.

BRIEF SUMMARY OF THE INVENTION

To solve the problems of the prior art, an optical element driving mechanism is provided, including: a movable part, a fixed part, and a driving assembly. The movable part is for connecting an optical element. The movable part is movable relative to the fixed part. The driving assembly is for generating a driving force to drive the movable part to move relative to the fixed part. The driving assembly further includes a first reinforcement element, for strengthening the driving force.

In some embodiments of the present disclosure, the driving assembly further includes: a driving coil, movable relative to the first reinforcement element; a first magnetic element, corresponding to the driving coil and fixed relative to the first reinforcement element. The first reinforcement element includes a magnetically conductive material. The first magnetic element surface of the first magnetic element has a planar structure and faces the driving coil. A first reinforcement portion of the first magnetic element has a plate-like structure and is parallel to the first magnetic element surface. The driving coil is located between the first magnetic element and the first reinforcement portion when viewed along the first axis which is parallel to the first magnetic element surface. The driving coil at least partially overlaps the first magnetic element and the first reinforcement portion when viewed along a second axis that is perpendicular to the first magnetic element surface.

In some embodiments of the present disclosure, the fixed part includes an outer frame, and the outer frame includes a first outer frame top wall and an outer frame sidewall. The first outer frame top wall has a plate-like structure and is perpendicular to the main axis. The outer frame sidewall has a plate-like structure and is not parallel to the first outer frame top wall. The main axis, the first axis and the second axis overlap each other. The first reinforcement element and the outer frame have an integrally formed structure. When viewed along the main axis, the optical element driving mechanism with a polygonal structure includes a first side, a second side, and a first corner. The first side is parallel to the first axis. The second side is parallel to the second axis. The first corner is located between the first side and the second side. The first magnetic element is located on the first side when viewed along the main axis. The first magnetic element surface is perpendicular to the second axis. The first reinforcement element is located at the first corner when viewed along the main axis.

In some embodiments of the present disclosure, the outer frame further includes an outer frame opening and a second outer frame top wall. The outer frame opening is formed on the first outer frame top wall, allowing light to pass through. The second outer frame top wall has a plate-like structure. The second outer frame top wall is parallel to the main axis. In the main axis, there is a non-zero distance between the first top surface of the first outer frame top wall and the second top surface of the second outer frame top wall. The first top surface and the second top surface face the same direction. The first top surface closely surrounds the outer frame opening. The second top surface closely surrounds the outer frame opening.

In some embodiments of the present disclosure, the driving assembly further includes: a second magnetic element, having a second magnetic element surface facing the movable part. The second magnetic element surface is perpendicular to the first axis. A second reinforcement portion of the first reinforcement element corresponds to the second magnetic element. The second reinforcement portion has a plate-like structure and is parallel to the second magnetic element surface. The first reinforcement element has a first connection portion that is connected to the first outer frame top wall, the first reinforcement portion, and the second reinforcement portion. The first reinforcement portion protrudes from the first connection portion. The second reinforcement portion protrudes from the first connection portion. The first reinforcement portion and the second reinforcement portion are not parallel to each other. The first reinforcement portion surface of the first reinforcement portion has a planar structure and is neither parallel nor perpendicular to the main axis. The first connection portion has a plate-like structure and is not parallel to the first axis or the second axis.

In some embodiments of the present disclosure, the driving assembly further includes a second reinforcement element corresponding to the second magnetic element. A third reinforcement portion of the second reinforcement element corresponds to the second magnetic element. A fourth reinforcement portion of the second reinforcement element corresponds to a third magnetic element of the driving assembly. The third reinforcement portion has a plate-like structure and is parallel to the second magnetic element surface. The second reinforcement element is located at a second corner of the optical element driving mechanism, and the second side is located between the first corner and the second corner when viewed along the main axis.

In some embodiments of the present disclosure, the movable part further includes a movable part body, a movable part accommodation, and a driving assembly fixing structure. The movable part accommodation has a recessed structure. The movable part accommodation can accommodate the first reinforcement element. The driving assembly fixing structure extends out from the movable part body in a direction that is perpendicular to the main axis. The driving coil is fixedly arranged on the driving assembly fixing structure. The movable part accommodation is formed by recessing the movable part body. The first movable part body surface of the movable part body, the second movable part body surface of the movable part body, the first driving coil surface of the driving coil, the second driving coil surface of the driving coil, and the movable part body form the movable part accommodating part. The first movable part body surface, the second movable part body surface, the first driving coil surface and the second driving coil surface are parallel to the main axis. The first movable part body surface and the first driving coil surface face each other and are parallel to each other. The second movable part body surface and the second driving coil surface face each other and are parallel to each other.

In some embodiments of the present disclosure, the first reinforcement element further includes a first connection portion, and the first reinforcement portion is connected to the first outer frame top wall via the first connection portion. The first connection portion has a plate-like structure and is perpendicular to the second axis.

In some embodiments of the present disclosure, the driving assembly further includes: a second magnetic element, having a second magnetic element surface facing the movable part, wherein the second magnetic element surface is perpendicular to the first axis; and a second reinforcement element, corresponding to the second magnetic element. The second reinforcement element includes a second connection portion, and the second reinforcement portion is connected to the first outer frame top wall via the second connection portion. The second connection portion has a plate-like structure and is perpendicular to the first axis. The second reinforcement element is located at a second corner of the optical element when viewed along the main axis.

In some embodiments of the present disclosure, the movable part further includes a movable part body, a movable part accommodation, and a driving assembly fixing structure. The movable part accommodation has a recessed structure. The movable part accommodation is used for accommodating the first reinforcement element. The driving assembly fixing structure extends outward from the movable part body in a direction that is perpendicular to the main axis. The driving coil is fixedly arranged on the driving assembly fixing structure. The movable part accommodation is formed by recessing the movable part body. The first movable part body surface of the movable part body, the second movable part body surface of the movable part body, the first driving coil surface of the driving coil, the second driving coil surface of the driving coil, and the movable part body form the movable part accommodating part. The first movable part body surface, the second movable part body surface, the first driving coil surface and the second driving coil surface are parallel to the main axis. The first movable part body surface and the first driving coil surface face each other and are parallel to each other. The shortest distance between the first reinforcement element and the first movable part body surface is shorter than the shortest distance between the first reinforcement element and the first driving coil surface.

In some embodiments of the present disclosure, the optical element driving mechanism further includes an elastic assembly that connects the movable part to the fixed part. The elastic assembly includes a first elastic element. The first elastic element includes a first elastic element outer portion, a first elastic element inner portion, and a first elastic element extension. The first elastic element outer portion is connected to the fixed part. The first elastic element inner portion is connected to the movable part. The first elastic element extension connects the first elastic element outer portion to the first elastic element inner portion. The first reinforcement element and the first elastic element at least partially overlap when viewed along the first axis.

In some embodiments of the present disclosure, the first reinforcement element and the first elastic element at least partially overlap when viewed along the second axis.

In some embodiments of the present disclosure, in the first axis, the shortest distance between the first driving coil surface and the first reinforcement element is shorter than the shortest distance between the first elastic element extension and the first reinforcement element.

In some embodiments of the present disclosure, in the second axis, the shortest distance between the second movable part body surface and the first reinforcement element is shorter than the shortest distance between the first elastic element extension and the first reinforcement element.

In some embodiments of the present disclosure, in the first axis, the shortest distance between the first movable part body surface and the first reinforcement element is shorter than the shortest distance between the first elastic element inner portion and the first reinforcement element.

In some embodiments of the present disclosure, in the second axis, the shortest distance between the second movable part body surface and the first reinforcement element is shorter than the shortest distance between the first elastic element inner portion and the first reinforcement element.

In some embodiments of the present disclosure, the first reinforcement portion and the second reinforcement portion at least partially overlap in the second axis.

In some embodiments of the present disclosure, the movable part body further includes a third movable part body surface, and there is a gap between the third movable part body surface and the second driving coil surface.

In some embodiments of the present disclosure, the shortest distance between the third movable part body surface and the second driving coil surface is shorter than the shortest distance between the first reinforcement element and the second driving coil surface.

In some embodiments of the present disclosure, the shortest distance between the third movable part body surface and the first driving coil surface is shorter than the shortest distance between the first reinforcement element and the first driving coil surface.

BRIEF DESCRIPTION OF THE DRAWINGS

In order to make the above and other objectives, features, and advantages of the present disclosure more obvious and understandable, preferred embodiments are listed below in conjunction with the accompanying drawings, which are described in detail as follows.

DETAILED DESCRIPTION OF THE INVENTION

The making and using of optical element driving mechanisms of embodiments of the present disclosure are discussed in detail below. It should be appreciated, however, that the embodiments provide many applicable inventive concepts that may be embodied in a wide variety of specific contexts. The specific embodiments discussed are merely illustrative of specific ways to make and use the embodiments and do not limit the scope of the present disclosure.

It should be understood that, although the terms "first", "second" etc. may be used herein to describe various elements, layers and/or portions, and these elements, layers, and/or portions should not be limited by these terms. These terms are only used to distinguish one element, layer, or portion. Thus, a first element, layer or portion discussed below could be termed a second element, layer or portion without departing from the teachings of some embodiments of the present disclosure. In addition, for the sake of brevity, terms such as "first" and "second" may not be used in the description to distinguish different elements. As long as it does not depart from the scope defined by the appended claims, the first element and/or the second element described in the appended claims can be interpreted as any element that meets the description in the specification.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Figure 1:
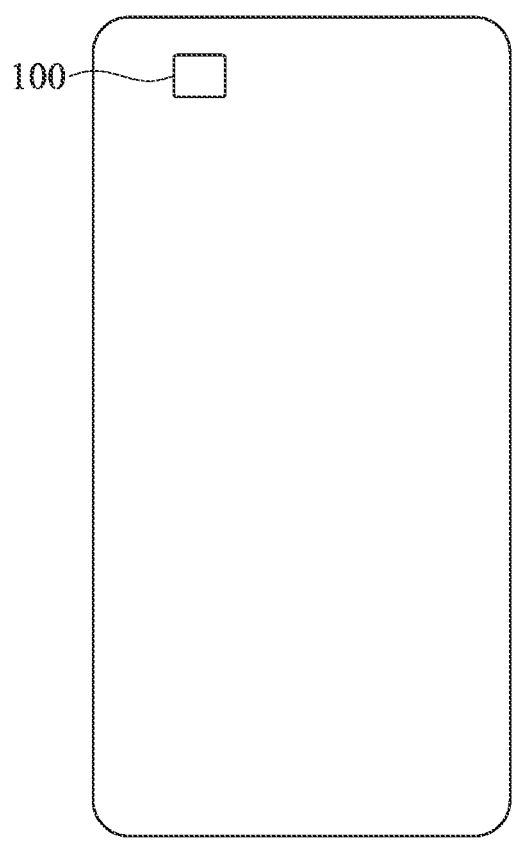
FIG. 1 is a schematic view of an electrical device according to some embodiment of the present disclosure.

Firstly, please refer to FIG. 1, FIG. 1 is a schematic view of an electrical device 1 according to some embodiment of the present disclosure. As shown in FIG. 1, an optical element driving mechanism 100 of some embodiment of the present disclosure may be mounted in an electrical device 1 for taking photos or videos, wherein the aforementioned electrical device 1 may, for example, be a smartphone or a digital camera, but the present disclosure is not limited to these. It should be noted that the position and the size between the optical element driving mechanism 9-100 and the electrical device 9-1 shown in FIG. 1 are only an example, which is not for limiting the position and the size between the optical element driving mechanism 100 and the electrical device 1. In fact, according to different needs, the optical element driving mechanism 100 may be mounted at different positions in the electrical device 1.

Figure 2:
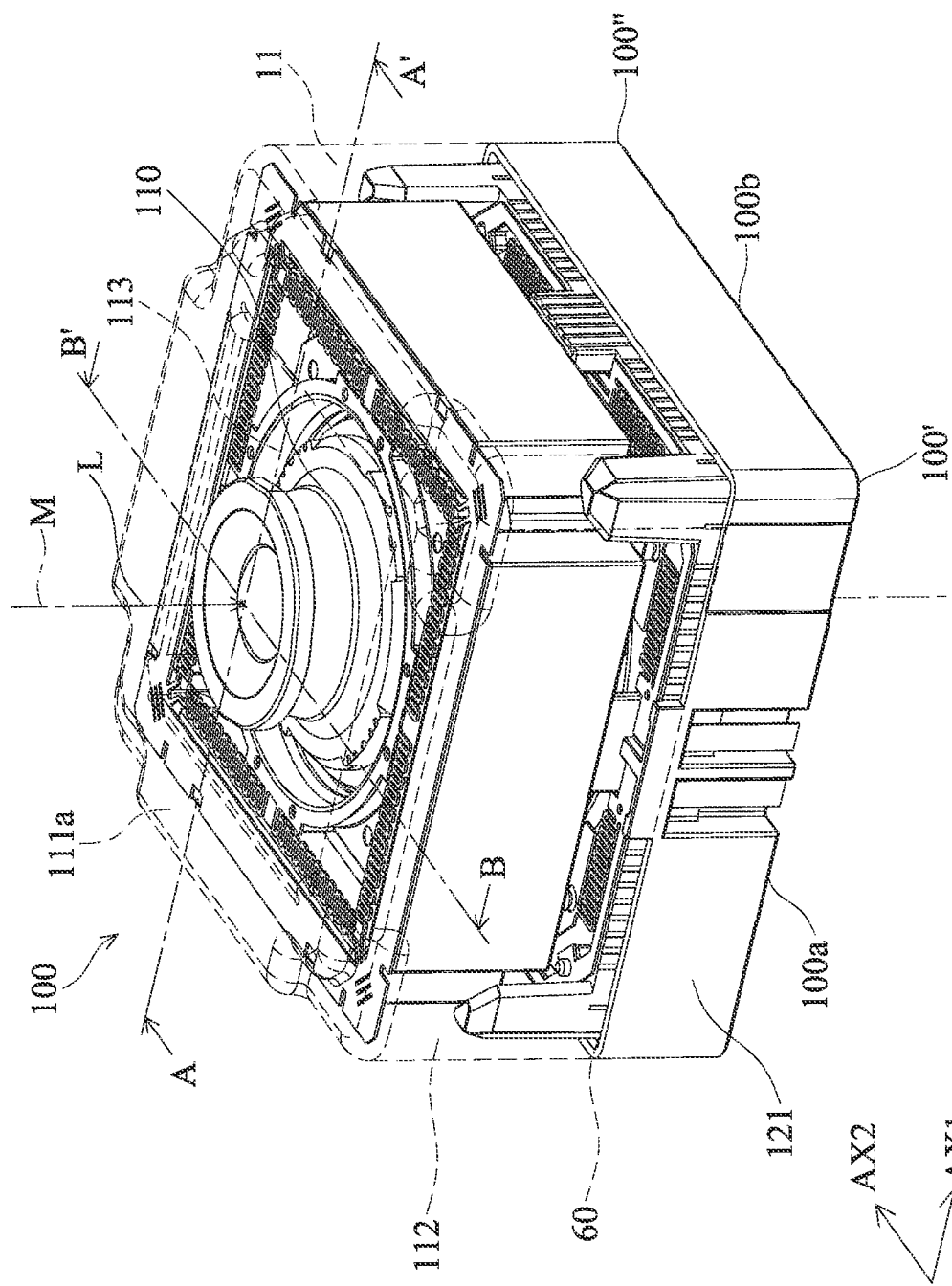
FIG. 2 is a schematic view of the optical element driving mechanism according to some embodiments of the present disclosure, in which the outer frame is shown as a dashed line.
Figure 3:
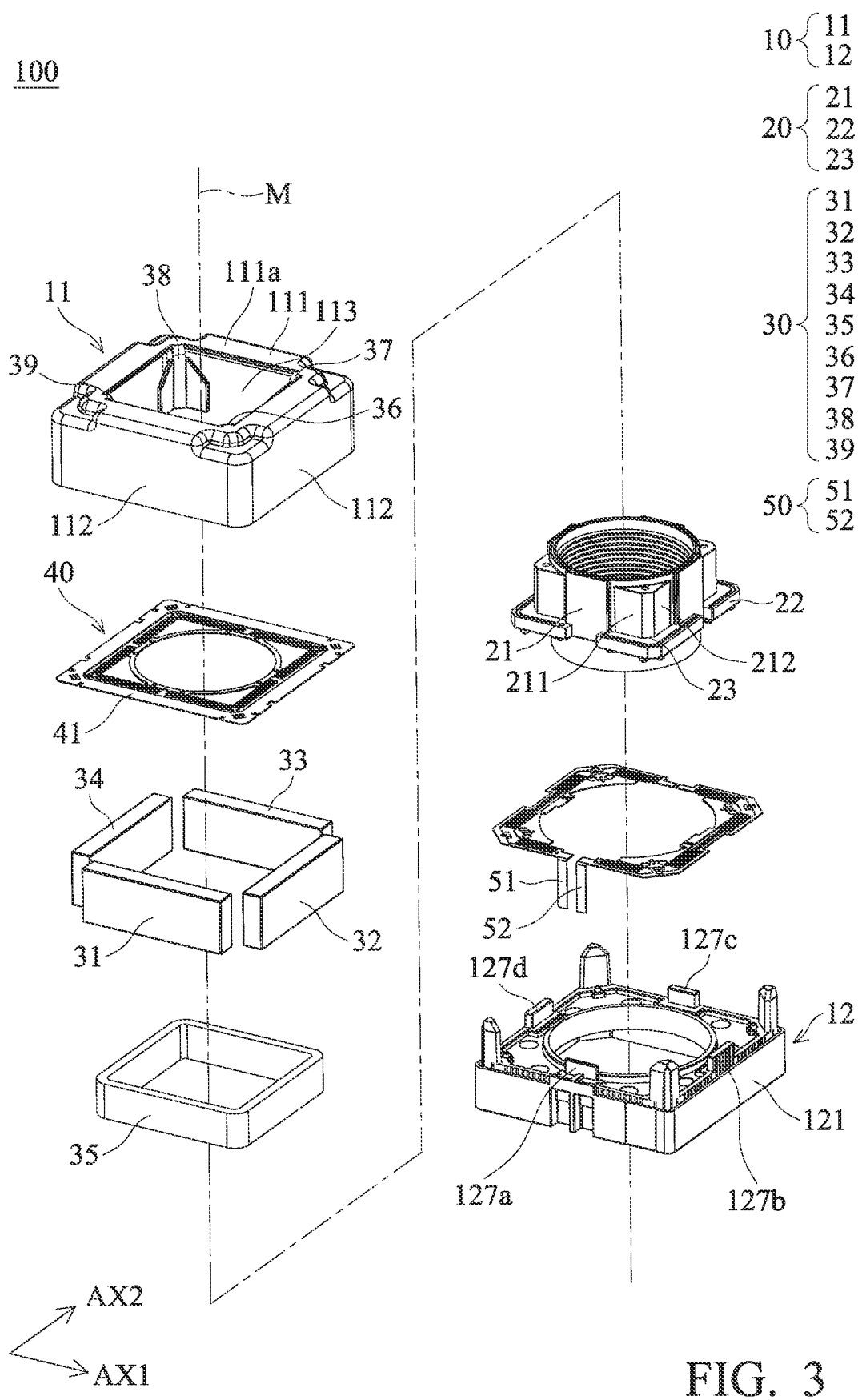
FIG. 3 is an exploded view of the optical element driving mechanism according to some embodiments of the present disclosure.

Please refer to FIG. 2 and FIG. 3. FIG. 2 is a schematic view of the optical element driving mechanism 100 according to some embodiments of the present disclosure, in which the outer frame is shown as a dashed line. FIG. 3 is an exploded view of the optical element driving mechanism 100 according to some embodiments of the present disclosure.

As shown in FIG. 2 and FIG. 3, the optical element driving mechanism 10X) may include a fixed part 10, a movable part 20, a driving assembly 30, an elastic assembly 40, a circuit assembly 50, and a connecting element 60.

According to some embodiments of the present disclosure, the optical element driving mechanism 100 may have a polygonal structure when viewed along the main axis M. Moreover, the optical element driving mechanism 100 may have a first side 100a, a second side 100b, a first corner 100', and a second corner 100".

According to some embodiments of the present disclosure, the first side 100a of the optical element driving mechanism 100 may be parallel to the first axis AX1. According to some embodiments of the present disclosure, the second side 100b of the optical element driving mechanism 100 may be parallel to a second axis AX2.

According to some embodiments of the present disclosure, the first corner 100' of the optical element driving mechanism 100 may be located between the first side 100a and second side 100b of the optical element driving mechanism 100. According to some embodiments of the present disclosure, the second side 100b of the optical element driving mechanism 100 may be located between the first corner 100' and the second corner 100" of the optical element driving mechanism 100.

According to some embodiments of the present disclosure, the main axis M, the first axis AX1 and the second axis AX2 overlap each other. According to some embodiments of the present disclosure, the main axis M, the first axis AX1, and the second axis AX2 are perpendicular to each other.

The fixed part 10 may include an outer frame 11 and a base 12. The movable part 20 may move relative to the fixed part 10, and the movable part 20 may be connected to an optical element 110. The movable part 20 may include a movable part body 21, a driving assembly fixing structure 22, and a movable part accommodation 23.

The driving assembly 30 may generate a driving force to drive the movable part 20 to move relative to the fixed part 10. The driving assembly 30 may include a first magnetic element 31, a second magnetic element 32, a third magnetic element 33, a fourth magnetic element 34, a driving coil 35, a first reinforcement element 36, a second reinforcement element 37, a third reinforcement element 38, and a fourth reinforcement element 39.

The elastic assembly 40 may connect the movable part 20 to the fixed part 10. The elastic assembly 40 may include a first elastic element 41. The circuit assembly 50 may be connected to an external circuit, and the circuit assembly 50 may include a first terminal 51 and a second terminal 52.

The outer frame 1I may include a first outer frame top wall 111, an outer frame sidewall 112, and an outer frame opening 113.

Figure 4:
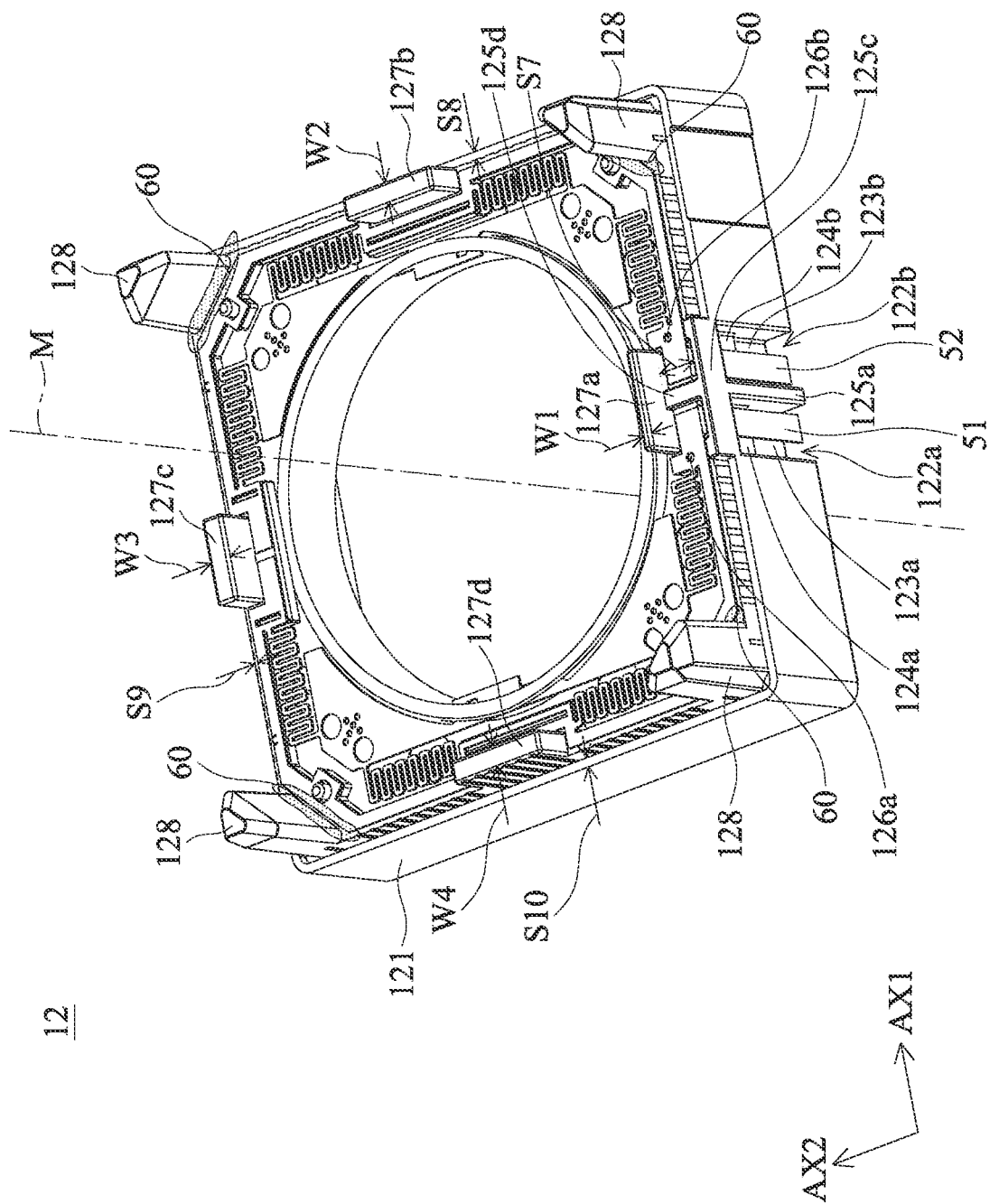
FIG. 4 is a schematic view of the base and the circuit assembly of the optical element driving mechanism according to some embodiments of the present disclosure.
Figure 5:
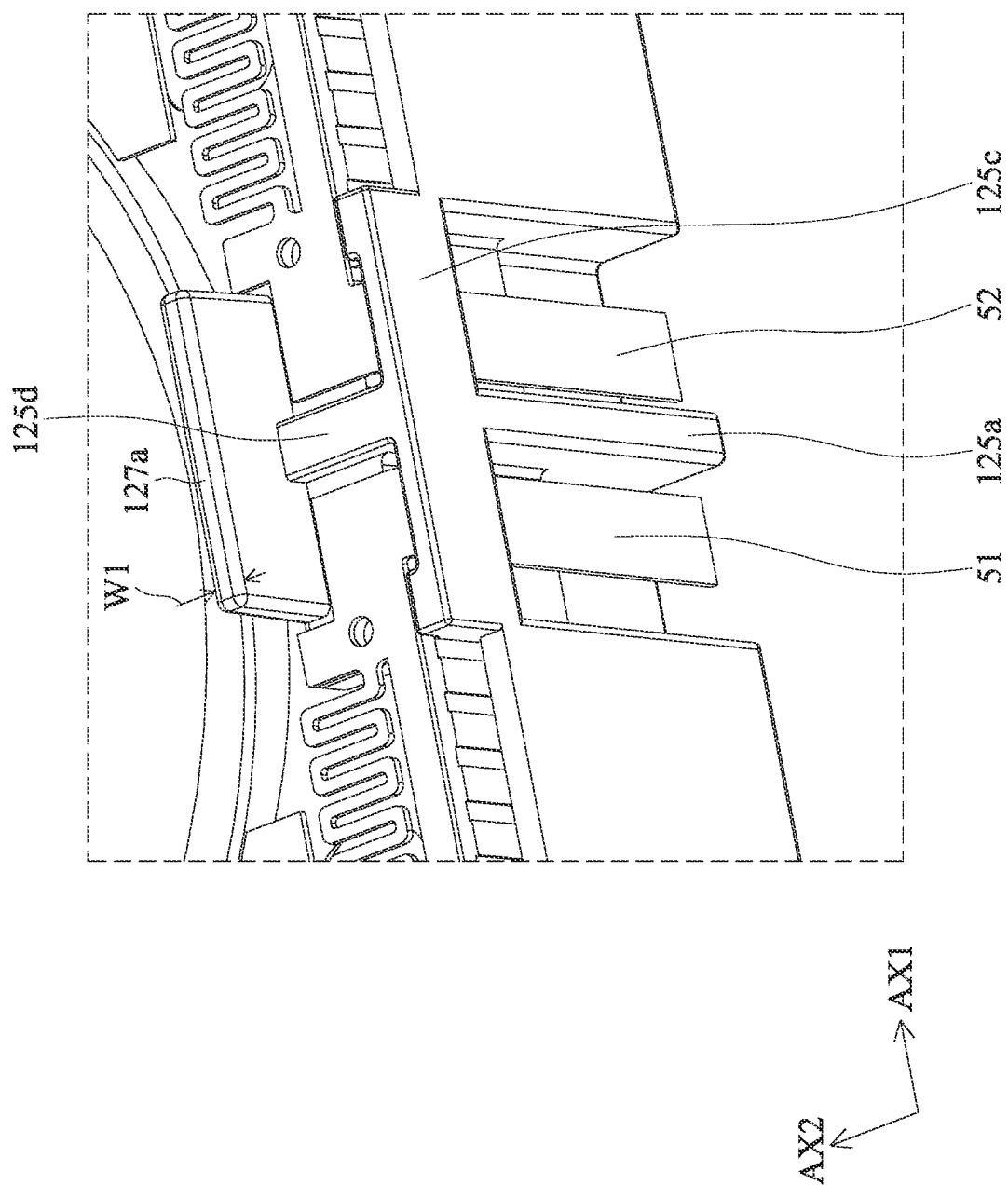
FIG. 5 is an enlarged schematic view of the base and the circuit assembly of the optical element driving mechanism according to some embodiments of the present disclosure.
Figure 6:
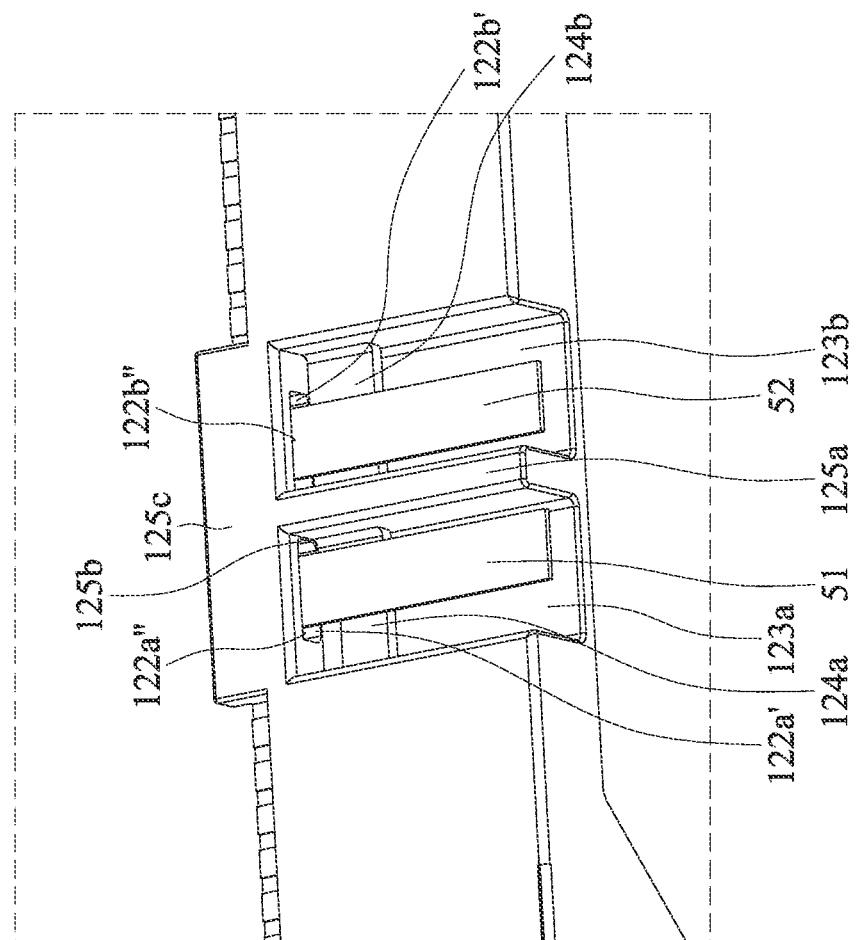
FIG. 6 is an enlarged schematic view of the base and the circuit assembly of the optical element driving mechanism according to some embodiments of the present disclosure.
Figure 7:
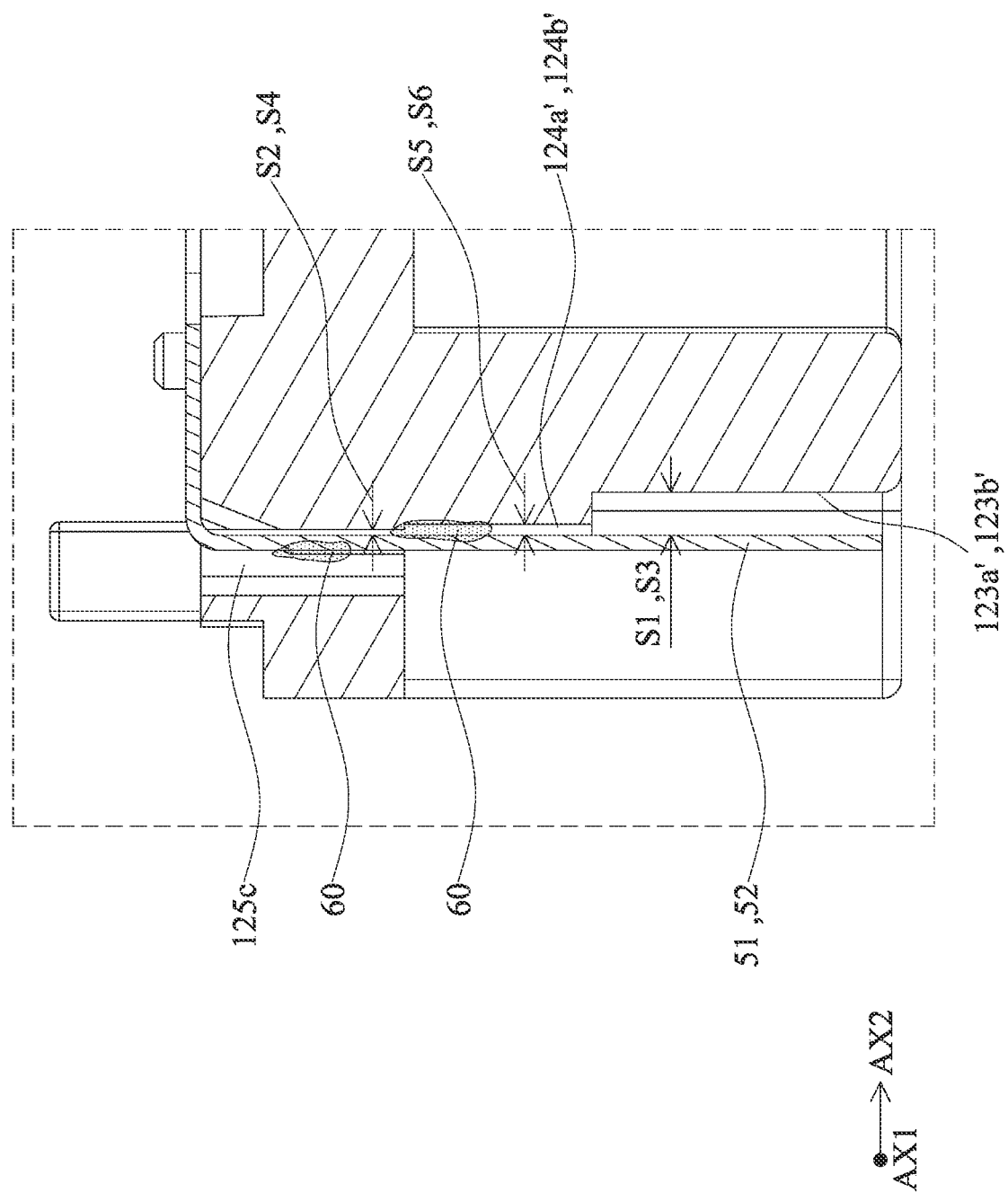
FIG. 7 is an enlarged sectional view of the base and the circuit assembly of the optical element driving mechanism according to some embodiments of the present disclosure.

Please refer to FIG. 4, FIG. 5, FIG. 6, and FIG. 7. FIG. 4 is a schematic view of the base 12 and the circuit assembly 50 of the optical element driving mechanism 100 according to some embodiments of the present disclosure; FIG. 5 is an enlarged schematic view of the base 12 and the circuit assembly 50 of the optical element driving mechanism 100 according to some embodiments of the present disclosure; FIG. 6 is an enlarged schematic view of the base 12 and the circuit assembly 50 of the optical element driving mechanism 100 according to some embodiments of the present disclosure; FIG. 7 is an enlarged sectional view of the base 12 and the circuit assembly of the optical element driving mechanism 100 according to some embodiments of the present disclosure.

As shown in the figure, the base 12 may include a base body 121, a terminal accommodation 122, an opening portion 123, a supporting portion 124, a spacing structure 125, a positioning structure 126, a magnetic element supporting block 127, and a driving assembly corresponding structure 128.

The terminal accommodation 122 may include a first terminal accommodation 122a and a second terminal accommodation 122b. The opening portion 123 may include a first opening portion 123a and a second opening portion 123b. The supporting portion 124 may include a first supporting portion 124a and a second supporting portion 124b.

The spacing structure 125 may include a first spacing structure 125a, a second spacing structure 125b, a third spacing structure 125c, and a fourth spacing structure 125d. The positioning structure 126 may include a first positioning structure 126a and a second positioning structure 126b.

The magnetic element supporting block 127 may include a first magnetic element supporting block 127a, a second magnetic element supporting block 127b, a third magnetic element supporting block 127c, and a fourth magnetic element supporting block 127d.

According to some embodiments of the present disclosure, the base body 121 may have a plate-like structure, and the base body 121 may be perpendicular to the main axis M. The outer frame sidewall 112 may be disposed on the base body 121, and the first outer frame top wall 111 may be disposed on the outer frame sidewall 112 (FIG. 2). According to some embodiments of the present disclosure, the outer frame the outer frame sidewall 112 11 may be fixedly connected to the base body 121 of the base 12 via the connecting element 60 (FIG. 4).

According to some embodiments of the present disclosure, the first outer frame top wall 111 may have a plate-like structure, and the first outer frame top wall 111 may be perpendicular to the main axis M. According to some embodiments of the present disclosure, the outer frame sidewall 112 may have a plate-like structure, and the outer frame sidewall 112 and the first outer frame top wall 111 may not be parallel to each other.

For example, according to some embodiments of the present disclosure, the outer frame sidewall 112 may be perpendicular or substantially perpendicular to the first outer frame top wall 111. Moreover, according to some embodiments of the present disclosure, the outer frame sidewall 112 may be parallel to the main axis M.

Please refer to FIG. 2, the outer frame opening 113 is formed on the first outer frame top wall 111, and the outer frame opening 113 may allow light L to pass through, so that the light L may enter the optical element 110 for imaging.

As shown in FIG. 2, the first outer frame top wall 111 may have a first top surface 111a. According to some embodiments of the present disclosure, the first top surface 111a of the first outer frame top wall 111 may be the uppermost surface of the first outer frame top wall 111. The first top surface 111a of the first outer frame top wall 111 may closely surround the opening 113 of the outer frame.

According to some embodiments of the present disclosure, the first terminal accommodation 122a may have an opened structure. According to some embodiments of the present disclosure, the first terminal accommodation 122a may have a closed perforation structure. The first terminal accommodation 122a may accommodate the first terminal 51 of the circuit assembly 50.

The first terminal accommodation 122a may include a first surface 122a' and a second surface 122a". According to some embodiments of the present disclosure, the first surface 122a' of the first terminal accommodating portion 122a and the second surface 122a" of the first terminal accommodating portion 122a face opposite directions.

According to some embodiments of the present disclosure, the first surface 122a' of the first terminal accommodating portion 122a may face the first terminal 51 of the circuit assembly 50, and the second surface 122a" of the first terminal accommodating portion 122a may face the first terminal 51 of the circuit assembly 50.

According to some embodiments of the present disclosure, the second terminal accommodation 122b may have an opened structure. According to some embodiments of the present disclosure, the second terminal accommodation 122b may have a closed perforation structure. The second terminal accommodation 122b may accommodate the second terminal 52 of the circuit assembly 50.

The second terminal accommodation 122b may include a first surface 122b' and a second surface 122b". According to some embodiments of the present disclosure, the first surface 122b' of the second terminal accommodating portion 122b and the second surface 122b" of the second terminal accommodation 122b face opposite directions.

According to some embodiments of the present disclosure, the first surface 122b' of the second terminal accommodating portion 122b may face the second terminal 52 of the circuit assembly 50, and the second surface 122b" of the second terminal accommodating portion 122b may face the second terminal 52 of the circuit assembly 50.

The first terminal 51 of the circuit assembly 50 may be exposed to the outside through the first opening portion 123a. The second terminal 52 of the circuit assembly 50 may be exposed to the outside through the second opening portion 123b.

The first opening portion 123a may have a first opening surface 123a'. The first opening surface 123a' of the first opening portion 123a may face the first terminal 51 of the circuit assembly 50.

According to some embodiments of the present disclosure, the first opening surface 123a' of the first opening portion 123a and the first surface 122a' of the first terminal accommodating portion 122a may face the same direction.

According to some embodiments of the present disclosure, the shortest distance S1 between the first opening surface 123a' of the first opening portion 123a and the first terminal 51 of the circuit assembly 50 may be greater than the shortest distance S2 between the first surface 122a' of the first terminal accommodating portion 122a the first terminal 51 of the circuit assembly 50.

Therefore, it may help the first terminal 51 of the circuit assembly 50 to connect with other elements, and it may help the circuit assembly 50 to dissipate heat. Furthermore, it is possible to prevent the first terminal 51 of the circuit assembly 50 from colliding with other elements when it is impacted, thereby avoiding the first terminal 51 of the circuit assembly 50 from being damaged.

The second opening portion 123b may have a second opening surface 123b'. The second opening surface 123b' of the second opening portion 123b may face the second terminal 52 of the circuit assembly 50.

According to some embodiments of the present disclosure, the second opening surface 123b' of the second opening portion 123b and the first surface 122b' of the second terminal accommodating portion 122b may face the same direction.

According to some embodiments of the present disclosure, the shortest distance S3 between the second opening surface 123b' of the second opening portion 123b and the second terminal 52 of the circuit assembly 50 may be greater than the shortest distance S4 between the first surface 122b' of the second terminal accommodating portion 122b and the second terminal 52 of the circuit assembly 50.

Therefore, it may help the second terminal 52 of the circuit assembly 50 to connect with other elements, and it may help the circuit assembly 50 to dissipate heat. Furthermore, it is possible to prevent the second terminal 52 of the circuit assembly 50 from colliding with other elements when it is impacted, thereby avoiding the second terminal 52 of the circuit assembly 50 from being damaged.

The first supporting portion 124a may have a first supporting portion surface 124a', and the first supporting portion surface 124a' of the first supporting portion 124a may face the first terminal 51 of the circuit assembly 50.

The first supporting portion 124a may protrude from the first opening portion 123a. Accordingly, the first supporting portion 124a may support the first terminal 51 of the circuit assembly 50 to prevent the excessive deformation of the first terminal 51 of the circuit assembly 50.

According to some embodiments of the present disclosure, the first supporting portion surface 124a' at least not partially overlap the second surface 122a" of the first terminal accommodation 122a when viewed along a direction that is perpendicular to the first supporting portion surface 124a'.

According to some embodiments of the present disclosure, the shortest distance S1 between the first opening surface 123a' of the first opening portion 123a and the first terminal 51 of the circuit assembly 50 is greater than the shortest distance S5 between the first supporting portion surface 124a' of the first supporting portion 124a and the first terminal 51 of the circuit assembly 50.

According to some embodiments of the present disclosure, the shortest distance S5 between the first supporting portion surface 124a' of the first supporting portion 124a and the first terminal 51 of the circuit assembly 50 is greater than the shortest distance S2 between the first surface 122a' of the first terminal accommodating portion 122a the first terminal 51 of the circuit assembly 50.

According to some embodiments of the present disclosure, the first terminal 51 of the circuit assembly 50 may be fixedly connected to the first supporting portion surface 124a' of the first supporting portion 124a via the connecting element 60.

According to some embodiments of the present disclosure, the connecting element 60 may be in direct contact with the first surface 122a' of the first terminal accommodation 122a.

According to some embodiments of the present disclosure, the connecting element 60 is not in direct contact with the first opening surface 123a' of the first opening portion 123a.

In this way, the first terminal 51 of the circuit assembly 50 may be more stable, and the reliability of the optical element driving mechanism 100 may be improved.

The second supporting portion 124b may have a second supporting surface 124b', and the second supporting surface 124b' of the second supporting portion 124b may face the second terminal 52 of the circuit assembly 50.

The second supporting portion 124b may protrude from the second opening portion 123b. Thus, the second supporting portion 124b may support the second terminal 52 of the circuit assembly 50 to prevent the excessive deformation of the second terminal 52 of the circuit assembly 50.

According to some embodiments of the present disclosure, the second supporting surface 124b' of the second supporting portion 124b at least not partially overlap the second surface 122b" of the second terminal accommodating portion 122b when viewed along a direction that is perpendicular to the second supporting surface 124b'.

According to some embodiments of the present disclosure, the shortest distance S3 between the second opening surface 123b' of the second opening portion 123b and the second terminal 52 of the circuit assembly 50 may be greater than the shortest distance S6 between the second supporting surface 124b' of the second supporting portion 124b and the second terminal 52 of the circuit assembly 50.

According to some embodiments of the present disclosure, the shortest distance S6 between the second supporting surface 124b' of the second supporting portion 124b and the second terminal 52 of the circuit assembly 50 is greater than the shortest distance S4 between the first surface 122b' of the second terminal accommodating portion 122b and the second terminal 52 of the circuit assembly 50.

According to some embodiments of the present disclosure, the second terminal 52 of the circuit assembly 50 may be fixedly connected to the second supporting surface 124b' of the second supporting portion 124b via the connecting element 60.

According to some embodiments of the present disclosure, the connecting element 60 may be in direct contact with the first surface 122b' of the second terminal accommodation 122b.

According to some embodiments of the present disclosure, the connecting element 60 is not in direct contact with the second opening surface 123b' of the second opening portion 123b.

In this way, the second terminal 52 of the circuit assembly 50 may be more stable, and the reliability of the optical element driving mechanism 100 may be improved.

The first spacing structure 125a may be located between the first terminal accommodating portion 122a and the second terminal accommodating portion 122b, so as to prevent the first terminal 51 and the second terminal 52 of the circuit assembly 50 from contacting and causing a short circuit.

The second spacing structure 125b may be located between the first terminal accommodating portion 122a and the second terminal accommodating portion 122b, so as to prevent the first terminal 51 and the second terminal 52 of the circuit assembly 50 from contacting and causing a short circuit.

The third spacing structures 125c may be located between the first terminal 51 and the second terminal 52 of the circuit assembly 50, so as to prevent the first terminal 51 and the second terminal 52 of the circuit assembly 50 from contacting and causing a short circuit.

The fourth spacing structures 125d may be located between the first terminal 51 and the second terminal 52 of the circuit assembly 50, so as to prevent the first terminal 51 and the second terminal 52 of the circuit assembly 50 from contacting and causing a short circuit.

According to some embodiments of the present disclosure, the first spacing structure 125a may protrude from the first opening surface 123a' of the first opening portion 123a.

According to some embodiments of the present disclosure, the second spacing structure 125b may protrude from the first surface 122a' of the first terminal accommodation 122a, and the connecting element 60 may be in direct contact with the second spacing structure 125b.

According to some embodiments of the present disclosure, the third spacing structure 125c may protrude from the second spacing structure 125b, and the connecting element 60 may be in direct contact with the third spacing structure 125c.

According to some embodiments of the present disclosure, the fourth spacing structure 125d may extend from the third spacing structure 125c, and the fourth spacing structure 125d may extend to the first magnetic element supporting block 127a.

The first positioning structure 126a may position the first terminal 51 of the circuit assembly 50. According to some embodiments of the present disclosure, the first positioning structure 126a may have a protruded structure. Moreover, the connecting element 60 may be in direct contact with the first positioning structure 126a and the first terminal 51 of the circuit assembly 50.

For example, the first positioning structure 126a may extend upwardly from the base body 121 and pass through the first terminal 51 of the circuit assembly 50 to fix the first terminal 51 of the circuit assembly 50 to the base body 121.

The first positioning structure 126a may position the first terminal 51 of the circuit assembly 50. According to some embodiments of the present disclosure, the first positioning structure 126a may have a protruded structure. Moreover, the connecting element 60 may be in direct contact with the first positioning structure 126a and the first terminal 51 of the circuit assembly 50.

For example, the first positioning structure 126a may extend upwardly from the base body 121 and pass through the first terminal 51 of the circuit assembly 50 to fix the first terminal 51 of the circuit assembly 50 to the base body 121.

According to some embodiments of the present disclosure, the first positioning structure 126a may be a recess. The first terminal 51 of the circuit assembly 50 may extend downward into the recess to fix the first terminal 51 of the circuit assembly 50 to the base body 121.

The second positioning structure 126b may position the second terminal 52 of the circuit assembly 50. According to some embodiments of the present disclosure, the second positioning structure 126b may have a protruded structure. Moreover, the connecting element 60 may be in direct contact with the second positioning structure 126b and the second terminal 52 of the circuit assembly 50.

For example, the second positioning structure 126b may extend upwardly from the base body 121 and pass through the second terminal 52 of the circuit assembly 50 to fix the second terminal 52 of the circuit assembly 50 to the base body 121.

The second positioning structure 126b may position the second terminal 52 of the circuit assembly 50. According to some embodiments of the present disclosure, the second positioning structure 126b may have a protruded structure. Moreover, the connecting element 60 may be in direct contact with the second positioning structure 126b and the second terminal 52 of the circuit assembly 50.

For example, the second positioning structure 126b may extend upwardly from the base body 121 and pass through the second terminal 52 of the circuit assembly 50 to fix the second terminal 52 of the circuit assembly 50 to the base body 121.

According to some embodiments of the present disclosure, the second positioning structure 126b may be a recess. The second terminal 52 of the circuit assembly 50 may extend downward into the recess to fix the second terminal 52 of the circuit assembly 50 to the base body 121.

According to some embodiments of the present disclosure, the first magnetic element supporting block 127a may be in contact with the fourth spacing structure 125d, and the first magnetic element supporting block 127a may correspond to the first magnetic element 31.

According to some embodiments of the present disclosure, the first magnetic element supporting block 127a may at least partially overlap the first magnetic element 31 when viewed along the main axis M.

According to some embodiments of the present disclosure, the second magnetic element supporting block 127b may correspond to the second magnetic element 32. According to some embodiments of the present disclosure, the second magnetic element supporting block 127b at least partially overlap the second magnetic element 32 when viewed along the main axis M.

According to some embodiments of the present disclosure, the width W1 of the first magnetic element supporting block 127a may be smaller than the width W2 of the second magnetic element supporting block 127b.

According to some embodiments of the present disclosure, the distance S7 between the first magnetic element supporting block 127a and the outer frame sidewall 112 of the outer frame 11 may be greater than the distance S8 between the second magnetic element supporting block 127b and the outer frame sidewall 112 of the outer frame 11.

According to some embodiments of the present disclosure, the third magnetic element supporting block 127c may correspond to the third magnetic element 33. According to some embodiments of the present disclosure, the third magnetic element supporting block 127c at least partially overlap the third magnetic element 33 when viewed along the main axis M.

According to some embodiments of the present disclosure, the width W1 of the first magnetic element supporting block 127a may be smaller than the width W3 of the third magnetic element supporting block 127c.

According to some embodiments of the present disclosure, the distance S7 between the first magnetic element supporting block 127a and the outer frame sidewall 112 of the outer frame 11 may be greater than the distance S9 between the third magnetic element supporting block 127*c* and the outer frame sidewall 112 of the outer frame 11.

According to some embodiments of the present disclosure, the fourth magnetic element supporting block 127*d* may correspond to the fourth magnetic element 34. According to some embodiments of the present disclosure, the fourth magnetic element supporting block 127*d* at least partially overlap the fourth magnetic element 34 when viewed along the main axis M.

According to some embodiments of the present disclosure, the width W1 of the first magnetic element supporting block 127*a* may be smaller than the width W4 of the fourth magnetic element supporting block 127*d*.

According to some embodiments of the present disclosure, the distance S7 between the first magnetic element supporting block 127*a* and the outer frame sidewall 112 of the outer frame 11 may be greater than the distance S10 between the fourth magnetic element supporting block 127*d* and the outer frame sidewall 112 of the outer frame 11.

In this way, the internal space of the optical element driving mechanism 100 may be used more effectively, and the effect of miniaturizing the optical element driving mechanism 100 may be achieved.

The driving assembly corresponding structure 128 may correspond to the driving assembly 30, and the driving assembly corresponding structure 128 may protrude from the base body 121. The connecting element 60 may be in direct contact with the driving assembly corresponding structure 128.

Figure 8:
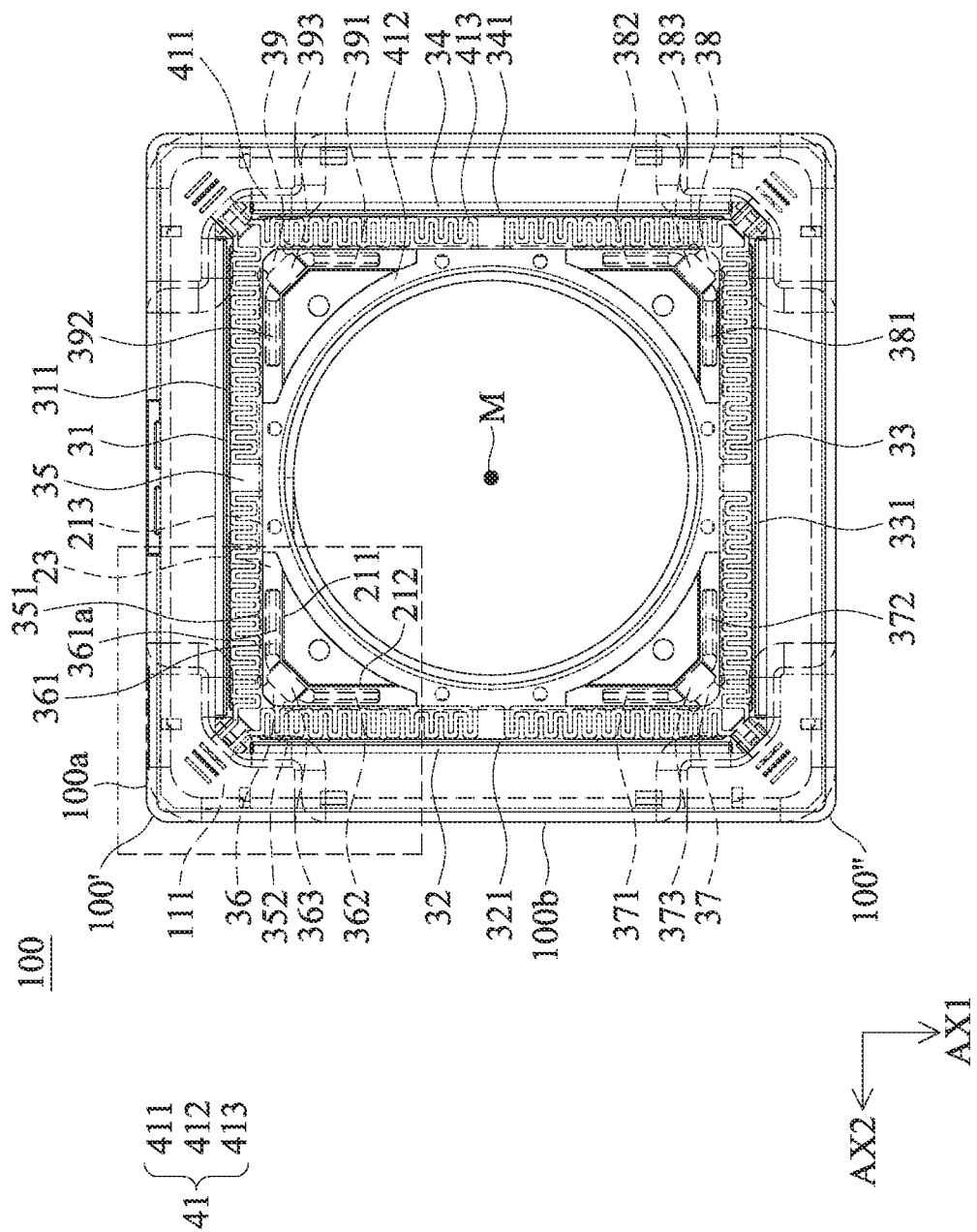
FIG. 8 is a schematic view of the optical element driving mechanism according to some embodiments of the present disclosure, in which the outer frame and the first elastic element are shown as dashed lines.
Figure 9:
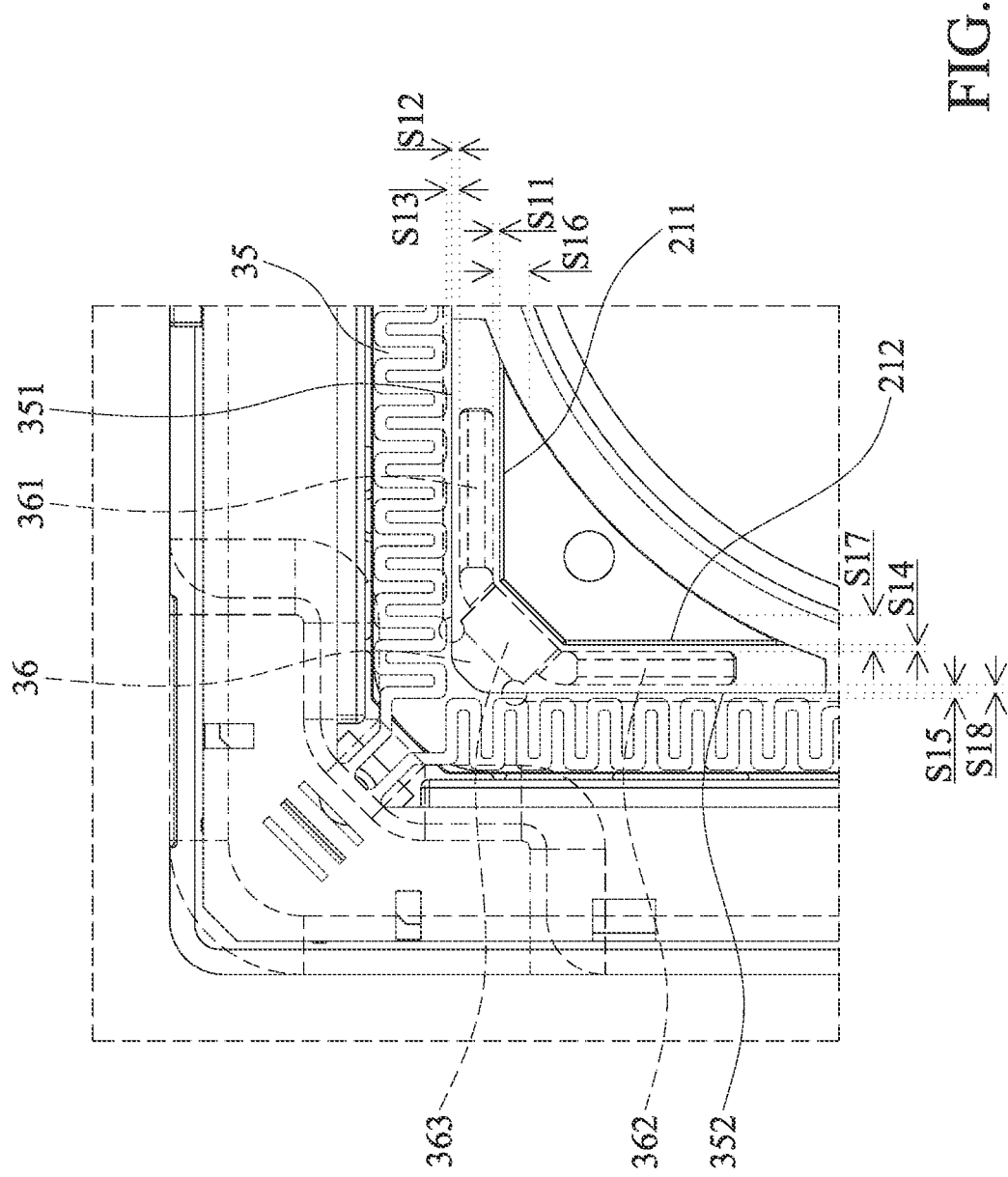
FIG. 9 is an enlarged schematic view of the optical element driving mechanism according to some embodiments of the present disclosure, wherein the outer frame and the first elastic element shown as dashed lines.
Figure 10:
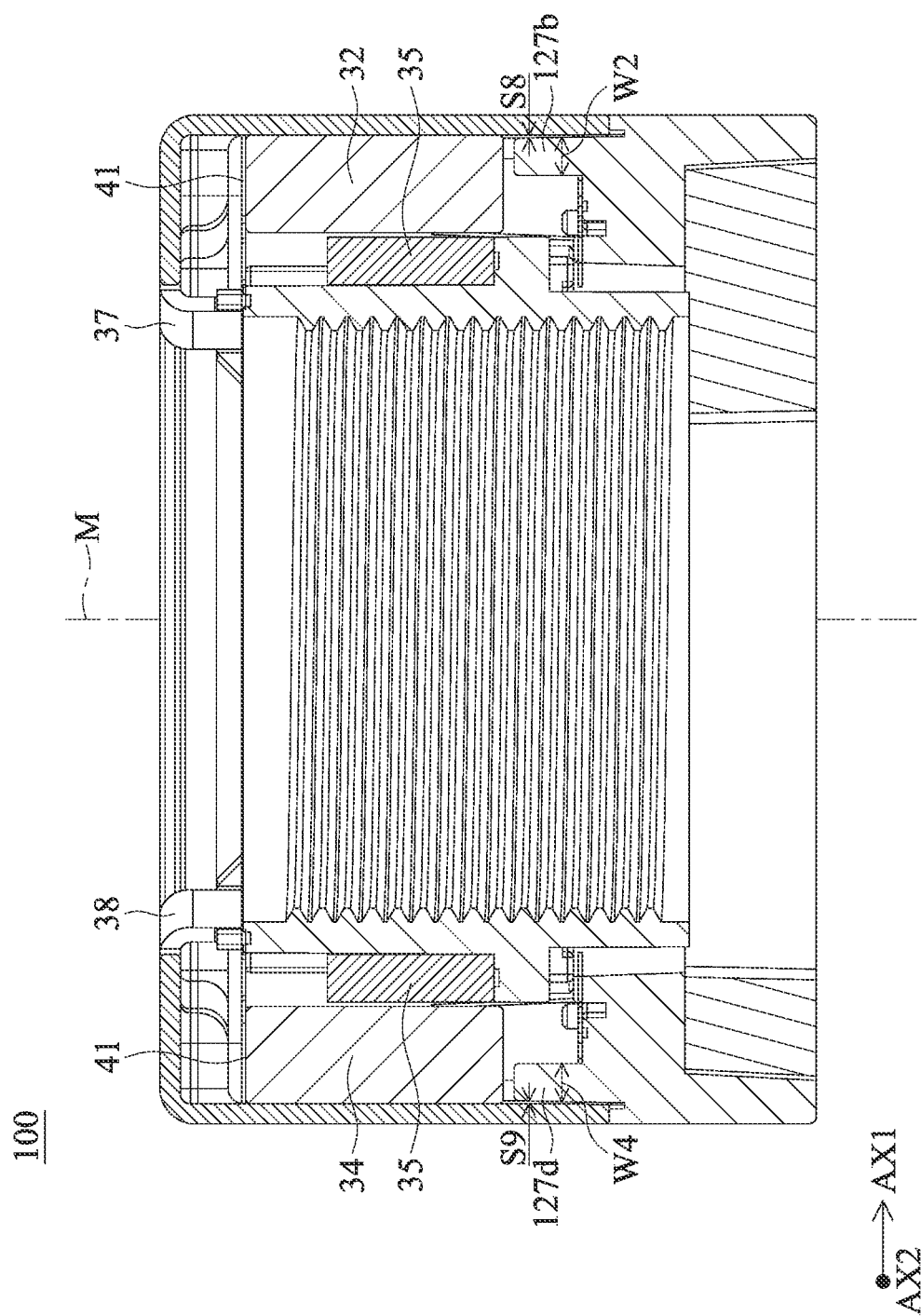
FIG. 10 is a cross-sectional view of the optical element driving mechanism along line A-A' of FIG. 2, according to some embodiments of the present disclosure.
Figure 11:
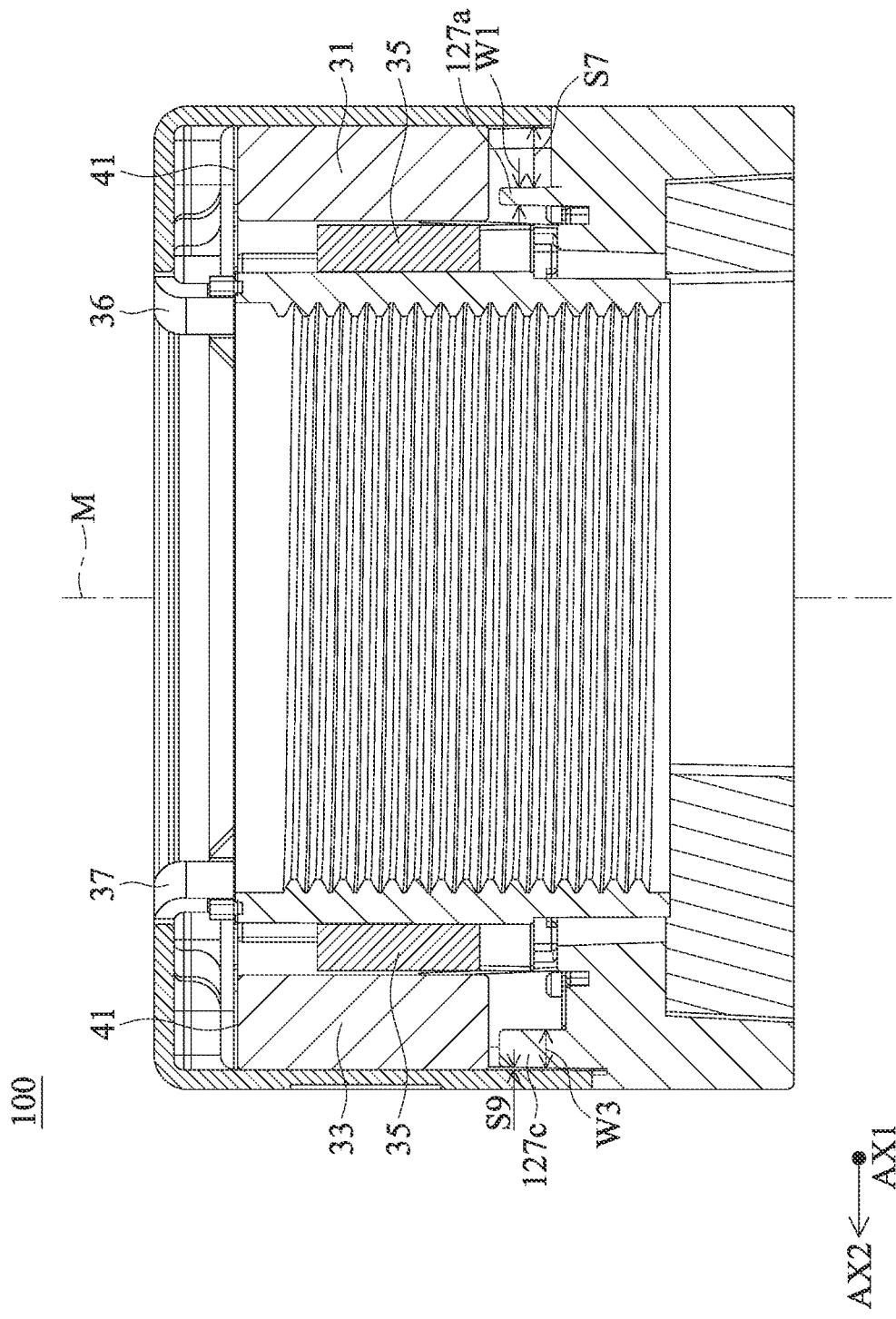
FIG. 11 is a cross-sectional view of the optical element driving mechanism along line B-B' of FIG. 2, according to some embodiments of the present disclosure.

Please refer to FIG. 8, FIG. 9, FIG. 10, and FIG. 11. FIG. 8 is a schematic view of the optical element driving mechanism 100 according to some embodiments of the present disclosure, in which the outer frame 11 and the first elastic element 41 are shown as dashed lines; FIG. 9 is an enlarged schematic view of the optical element driving mechanism 100 according to some embodiments of the present disclosure, wherein the outer frame 11 and the first elastic element 41 shown as dashed lines; FIG. 10 is a cross-sectional view of the optical element driving mechanism 100 along line A-A' of FIG. 2, according to some embodiments of the present disclosure; FIG. 11 is a cross-sectional view of the optical element driving mechanism 100 along line B-B' of FIG. 2, according to some embodiments of the present disclosure.

According to some embodiments of the present disclosure, the movable part body 21 may have a first movable part body surface 211, a second movable part body surface 212, and a third movable part body surface 213. According to some embodiments of the present disclosure, the first movable part body surface 211 and the second movable part body surface 212 may be parallel to the main axis M.

The driving assembly fixing structure 22 may extend outward along a direction that is perpendicular to the main axis M from the movable body 21.

According to some embodiments of the present disclosure, the movable part accommodation 23 may have a recessed structure, and the movable part accommodation 23 may accommodate the first reinforcement element 36, the second reinforcement element 37, the third reinforcement element 38, and the fourth reinforcement element 39. According to some embodiments of the present disclosure, the movable part accommodation 23 may be formed by recessing the movable part body 21.

According to some embodiments of the present disclosure, the first magnetic element 31, the second magnetic element 32, the third magnetic element 33, and the fourth magnetic element 34 correspond to the driving coil 35.

According to some embodiments of the present disclosure, the first magnetic element 31 is fixed relative to the first reinforcement element 36. The second magnetic element 32 is fixed relative to the second reinforcement element 37. The third magnetic element 33 is fixed relative to the second reinforcement element 38. The fourth magnetic element 34 is fixed relative to the fourth reinforcement element 39.

According to some embodiments of the present disclosure, the first magnetic element 31 may be located at the first side 100*a* of the optical element driving mechanism 100 when viewed along the main axis M.

According to some embodiments of the present disclosure, the first magnetic element 31 may have a first magnetic element surface 311, the first magnetic element surface 311 may have a planar structure, and the first magnetic element surface 311 may face the driving coil 35. The first magnetic element surface 311 may be perpendicular to the second axis AX2.

According to some embodiments of the present disclosure, the second magnetic element 32 may have a second magnetic element surface 321, and the second magnetic element surface 321 may face the movable part 20. The second magnetic element surface 321 may be perpendicular to the first axis AX1.

According to some embodiments of the present disclosure, the third magnetic element 33 may have a third magnetic element surface 331, and the third magnetic element surface 331 may face the movable part 20. The third magnetic element surface 331 may be perpendicular to the second axis AX2.

According to some embodiments of the present disclosure, the fourth magnetic element 34 may have a fourth magnetic element surface 341, and the fourth magnetic element surface 341 may face the movable part 20. The fourth magnetic element surface 341 may be perpendicular to the first axis AX1.

According to some embodiments of the present disclosure, the driving coil 35 may be fixedly arranged on the driving assembly fixing structure 22, and the driving coil 35 may move relative to the first reinforcement element 36.

The driving coil 35 may have a first driving coil surface 351 and a second driving coil surface 352. The first movable part body surface 211 and the second movable part body surface 212 of the movable part body 21, and the first driving coil surface 351 and the second driving coil surface 352 of the driving coil 35, and the movable part body 21 form the movable part accommodation 23.

According to some embodiments of the present disclosure, the first driving coil surface 351 and the second driving coil surface 352 may be parallel to the main axis M.

According to some embodiments of the present disclosure, the first movable part body surface 211 and the first driving coil surface 351 may face each other and may be parallel to each other.

According to some embodiments of the present disclosure, the second movable part body surface 212 and the second driving coil surface 352 may face each other and may be parallel to each other.

According to some embodiments of the present disclosure, the movable part body surface 213 may abut the second driving coil surface 352. According to some embodiments of the present disclosure, there may be a gap between the third movable part body surface 213 and the second driving coil surface 352.

The first reinforcement element 36, the second reinforcement element 37, the third reinforcement element 38, and the fourth reinforcement element 39 may strengthen the driving force generated by the driving assembly 30.

The first reinforcement element 36 may be located at the first corner 100' of the optical element driving mechanism 100 when viewed along the main axis M.

The second reinforcement element 37 may be located at the second corner 100" of the optical element driving mechanism 100 when viewed along the main axis M.

The first reinforcement element 36, the second reinforcement element 37, the third reinforcement element 38, and the fourth reinforcement element 39 have an integrally formed structure with the outer frame 11.

That is, the first reinforcement element 36, the second reinforcement element 37, the third reinforcement element 38, and the fourth reinforcement element 39, and the outer frame 11 do not need to be fixed with glues or additional connecting manners.

The shortest distance S11 between the first reinforcement element 36 and the first movable part body surface 211 is shorter than the shortest distance S12 between the first reinforcement element 36 and the first driving coil surface 351.

According to some embodiments of the present disclosure, the first reinforcement element 36 may include a magnetically conductive material. The first reinforcement element 36 may include a first reinforcement portion 361, a second reinforcement portion 362, and a first connection portion 363.

According to some embodiments of the present disclosure, the first reinforcement portion 361 may have a plate-like structure, and the first reinforcement portion 361 may be parallel to the first magnetic element surface 311.

According to some embodiments of the present disclosure, the second reinforcement portion 362 may correspond to the second magnetic element 32. According to some embodiments of the present disclosure, the second reinforcement portion 362 may have a plate-like structure, and the second reinforcement portion 362 may be parallel to the second magnetic element surface 321.

According to some embodiments of the present disclosure, the driving coil 35 may be located between the first magnetic element 31 and the first reinforcement portion 361 when viewed along the first axis AX1 that is parallel to the first magnetic element surface 311.

According to some embodiments of the present disclosure, the driving coil 35 may at least partially overlap the first magnetic element 31 and the first reinforcement portion 361 when viewed along the second axis AX2 that is perpendicular to the first magnetic element surface 311.

The first connection portion 363 may connect to the first outer frame top wall 111, the first reinforcement portion 361, and the second reinforcement portion 362. The first reinforcement portion 361 of the first reinforcement element 36 may be connected to the first outer frame top wall 111 via the first connection portion 363.

According to some embodiments of the present disclosure, the first reinforcement portion 361 may protrude from the first connection portion 363. According to some embodiments of the present disclosure, the second reinforcement portion 362 may protrude from the first connection portion 363. According to some embodiments of the present disclosure, the first reinforcement portion 361 and the second reinforcement portion 362 are not parallel to each other.

According to some embodiments of the present disclosure, the first reinforcement portion surface 361a of the first reinforcement portion 361 may have a planar structure, and the first reinforcement portion surface 361a of the first reinforcement portion 361 may not be parallel or perpendicular to the main axis M.

According to some embodiments of the present disclosure, in the second axis AX2, the first reinforcement portion 361 and the second reinforcement portion 362 are at least partially overlapped.

According to some embodiments of the present disclosure, the first connection portion 363 has a plate-like structure, and the first connection portion 363 is not parallel to the first axis AX1 or the second axis AX2. According to some embodiments of the present disclosure, the first connection portion 363 may be perpendicular to the second axis AX2.

The second reinforcement element 37 may correspond to the second magnetic element 32. The second reinforcement element 37 may include a third reinforcement portion 371, a fourth reinforcement portion 372, and a second connection portion 373.

The third reinforcement portion 371 may correspond to the second magnetic element 32. The fourth reinforcement portion 372 may correspond to the third magnetic element 33. The third reinforcement portion 371 may have a plate-like structure, and the third reinforcement portion 371 may be parallel to the second magnetic element surface 321. The fourth reinforcement portion 372 may have a plate-like structure, and the fourth reinforcement portion 372 may be parallel to the third magnetic element surface 331.

The second connection portion 373 may connect to the first outer frame top wall 111, the third reinforcement portion 371, and the fourth reinforcement portion 372. The third reinforcement portion 371 of the second reinforcement element 37 may be connected to the first outer frame top wall 111 via the second connection portion 373.

According to some embodiments of the present disclosure, the third reinforcement portion 371 may protrude from the second connection portion 373. According to some embodiments of the present disclosure, the fourth reinforcement portion 372 may protrude from the second connection portion 373. According to some embodiments of the present disclosure, the third reinforcement portion 371 and the second connection portion 373 are not parallel to each other.

The third reinforcement element 38 may correspond to the third magnetic element 33. The third reinforcement element 38 may include a fifth reinforcement portion 381, a sixth reinforcement portion 382, and a third connection portion 383.

The fifth reinforcement portion 381 may correspond to the third magnetic element 33. The sixth reinforcement portion 382 may correspond to the fourth magnetic element 34. The fifth reinforcement portion 381 may have a plate-like structure, and the fifth reinforcement portion 381 may be parallel to the third magnetic element surface 331. The sixth reinforcement portion 382 may have a plate-like structure, and the sixth reinforcement portion 382 may be parallel to the fourth magnetic element surface 341.

The third connection portion 383 may connect to the first outer frame top wall 111, the fifth reinforcement portion 381, and the sixth reinforcement portion 382. The fifth reinforcement portion 381 of the third reinforcement element 38 may be connected to the first outer frame top wall 111 via the third connection portion 383.

According to some embodiments of the present disclosure, the fifth reinforcement portion 381 may protrude from the third connection portion 383. According to some embodiments of the present disclosure, the sixth reinforcement portion 382 may be formed by the third connection portion 383. According to some embodiments of the present disclosure, the fifth reinforcement portion 381 and the third connection portion 383 are not parallel to each other.

The fourth reinforcement element 39 may correspond to the fourth magnetic element 34. The fourth reinforcement element 39 may include a seventh reinforcement portion 391, an eighth reinforcement portion 392, and a fourth connection portion 393.

The seventh reinforcement portion 391 may correspond to the fourth magnetic element 34. The eighth reinforcement portion 392 may correspond to the first magnetic element 31. The seventh reinforcement portion 391 may have a plate-like structure, and the seventh reinforcement portion 391 may be parallel to the fourth magnetic element surface 341. The eighth reinforcement portion 392 may have a plate-like structure, and the eighth reinforcement portion 392 may be parallel to the first magnetic element surface 311.

The fourth connection portion 393 may connect to the first outer frame top wall 111, the seventh reinforcement portion 391, and the eighth reinforcement portion 392. The seventh reinforcement portion 391 of the fourth reinforcement element 39 may be connected to the first outer frame top wall 111 via the fourth connection portion 393.

According to some embodiments of the present disclosure, the seventh reinforcement portion 391 may protrude from the fourth connection portion 393. According to some embodiments of the present disclosure, the eighth reinforcement portion 392 may protrude from the fourth connection portion 393. According to some embodiments of the present disclosure, the seventh reinforcement portion 391 and the fourth connection portion 393 are not parallel to each other.

The first elastic element 41 may include a first elastic element outer portion 411, a first elastic element inner portion 412, and a first elastic element extension 413.

The first elastic element outer portion 411 may be connected to the fixed part 10. The first elastic element inner portion 412 may be connected to the movable part 20. The first elastic element extension 413 may connect the first elastic element outer portion 411 and the first elastic element inner portion.

According to some embodiments of the present disclosure, the first reinforcement element 36 and the first elastic element 41 at least partially overlap when viewed along the first axis AX1. According to some embodiments of the present disclosure, the first reinforcement element 36 and the first elastic element 41 at least partially overlap when viewed along the second axis AX2.

According to some embodiments of the present disclosure, in the second axis AX2, the shortest distance S12 between the first driving coil surface 351 and the first reinforcement element 36 is shorter than the shortest distance S13 between the first elastic element extension 413 and the first reinforcement element 36.

According to some embodiments of the present disclosure, in the first axis AX1, the shortest distance S14 between the second movable part body surface 212 and the first reinforcement element 36 is shorter than the shortest distance S15 between the first elastic element extension 413 and the first reinforcement element 36.

According to some embodiments of the present disclosure, in the second axis AX2, the shortest distance S11 between the first movable part body surface 211 and the first reinforcement element 36 is shorter than the shortest distance S16 between the first elastic element inner portion 412 and the first reinforcement element 36.

According to some embodiments of the present disclosure, in the first axis AX1, the shortest distance S14 between the second movable part body surface 212 and the first reinforcement element 36 is shorter than the shortest distance S17 between the first elastic element inner portion 412 and the first reinforcement element 36.

According to some embodiments of the present disclosure, the shortest distance (may be zero) between the third movable part body surface 213 and the first driving coil surface 351 is shorter than the shortest distance S12 between the first reinforcement element 36 and the first driving coil surface 351.

According to some embodiments of the present disclosure, the shortest distance (may be zero) between the third movable part body surface 213 and the first driving coil surface 352 is shorter than the shortest distance S18 between the first reinforcement element 36 and the second surface of the driving coil 352.

Figure 12:
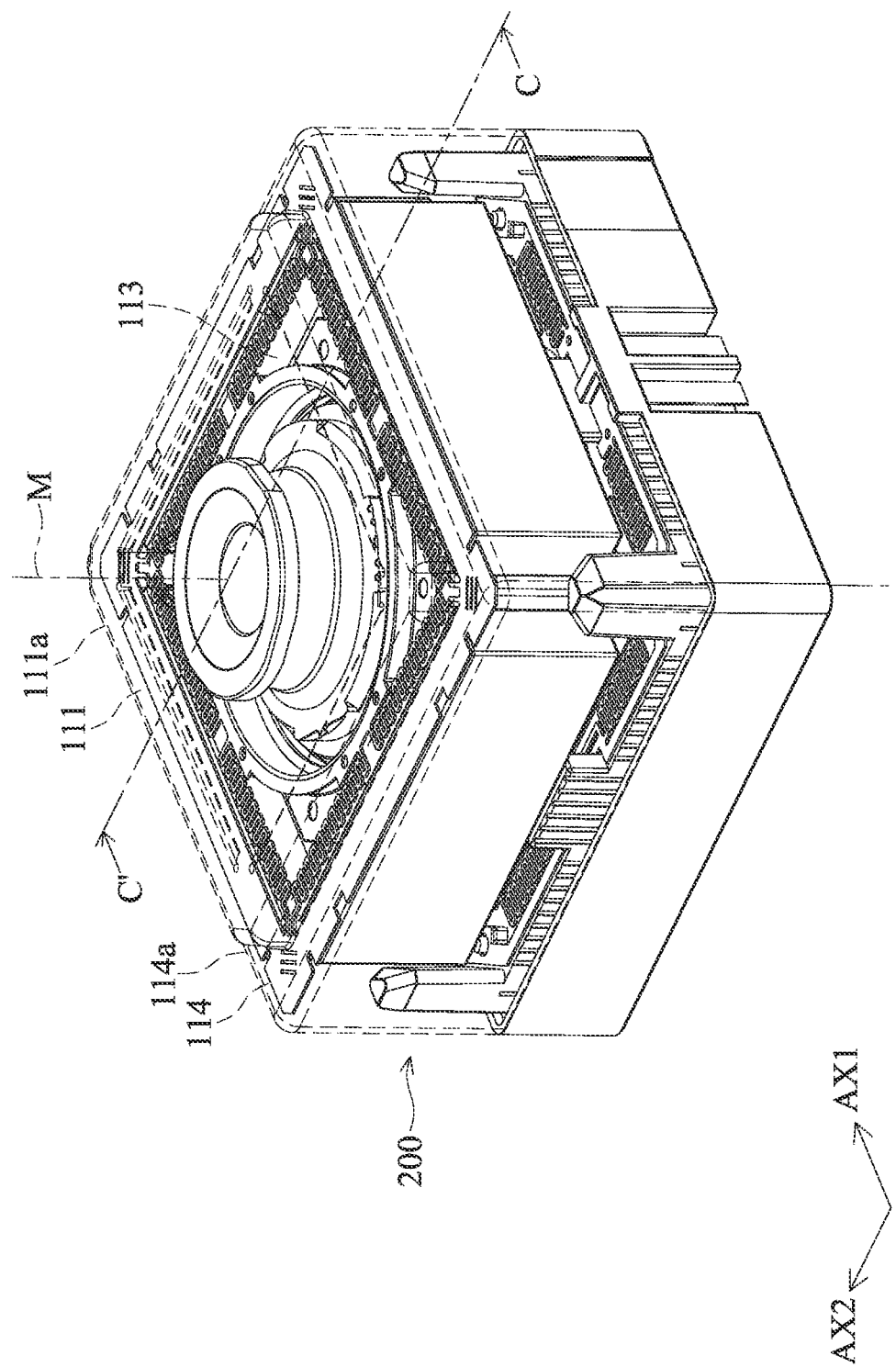
FIG. 12 is a schematic view of the optical element driving mechanism according to some embodiments of the present disclosure, in which the outer frame is shown as a dashed line.
Figure 13:
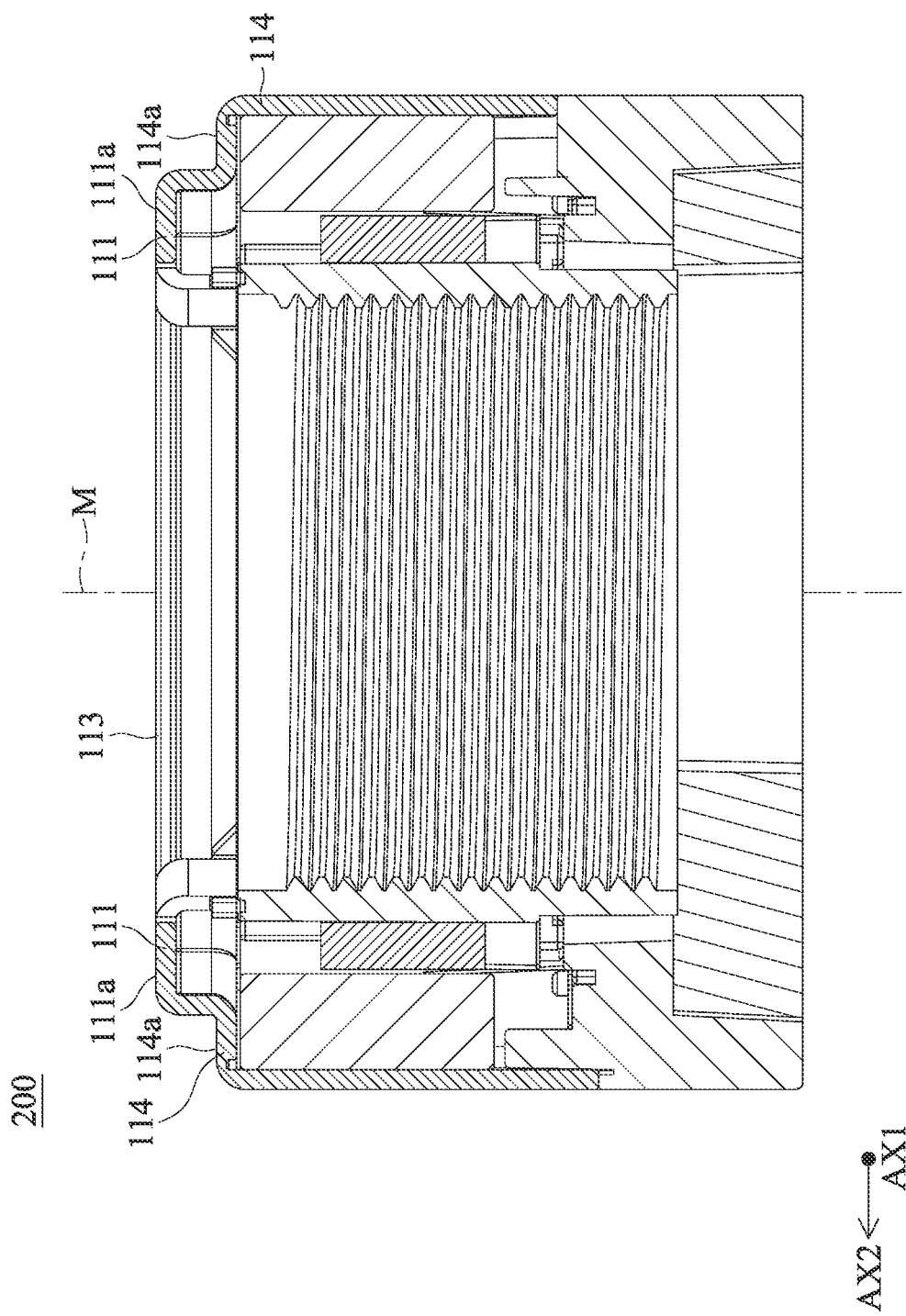
FIG. 13 is a cross-sectional view of the optical element driving mechanism along line C-C of FIG. 12, according to some embodiments of the present disclosure.

Please refer to FIG. 12 and FIG. 13. FIG. 12 is a schematic view of the optical element driving mechanism 200 according to some embodiments of the present disclosure, in which the outer frame 11 is shown as a dashed line; FIG. 13 is a cross-sectional view of the optical element driving mechanism 200 along line C-C' of FIG. 12, according to some embodiments of the present disclosure.

The elements and arrangements of the optical element driving mechanism 200 are substantially the same as that of the optical element driving mechanism 100, the similar part will not be repeated herein.

The main difference between the optical element driving mechanism 200 and the optical element driving mechanism 100 is that the outer frame 11 of the optical element driving mechanism 200 may further include a second outer frame top wall 114. Moreover, the second outer frame top wall 114 may have a second top surface 114a.

According to some embodiments of the present disclosure, the second outer frame top wall 114 may have a plate-like structure, and the second outer frame top wall 114 may be parallel to the main axis M.

In the main axis M, there may be a non-zero distance between the first top surface 111a of the first outer frame top wall 111 and the second top surface 114a of the second outer frame top wall 114.

According to some embodiments of the present disclosure, the first top surface 111a of the first outer frame top wall 111 and the second top surface 114a of the second outer frame top wall 114 may face the same direction. The second top surface 114a of the second outer frame top wall 114 closely surround the outer frame opening 113. Moreover, the first outer frame top wall 111 may be interposed between the second outer frame top wall 114 and the outer frame opening 113.

In this way, the space of the optical element driving mechanism 200 may be effectively saved, and the effect of miniaturizing the optical element driving mechanism 200 may be achieved.

Figure 14:
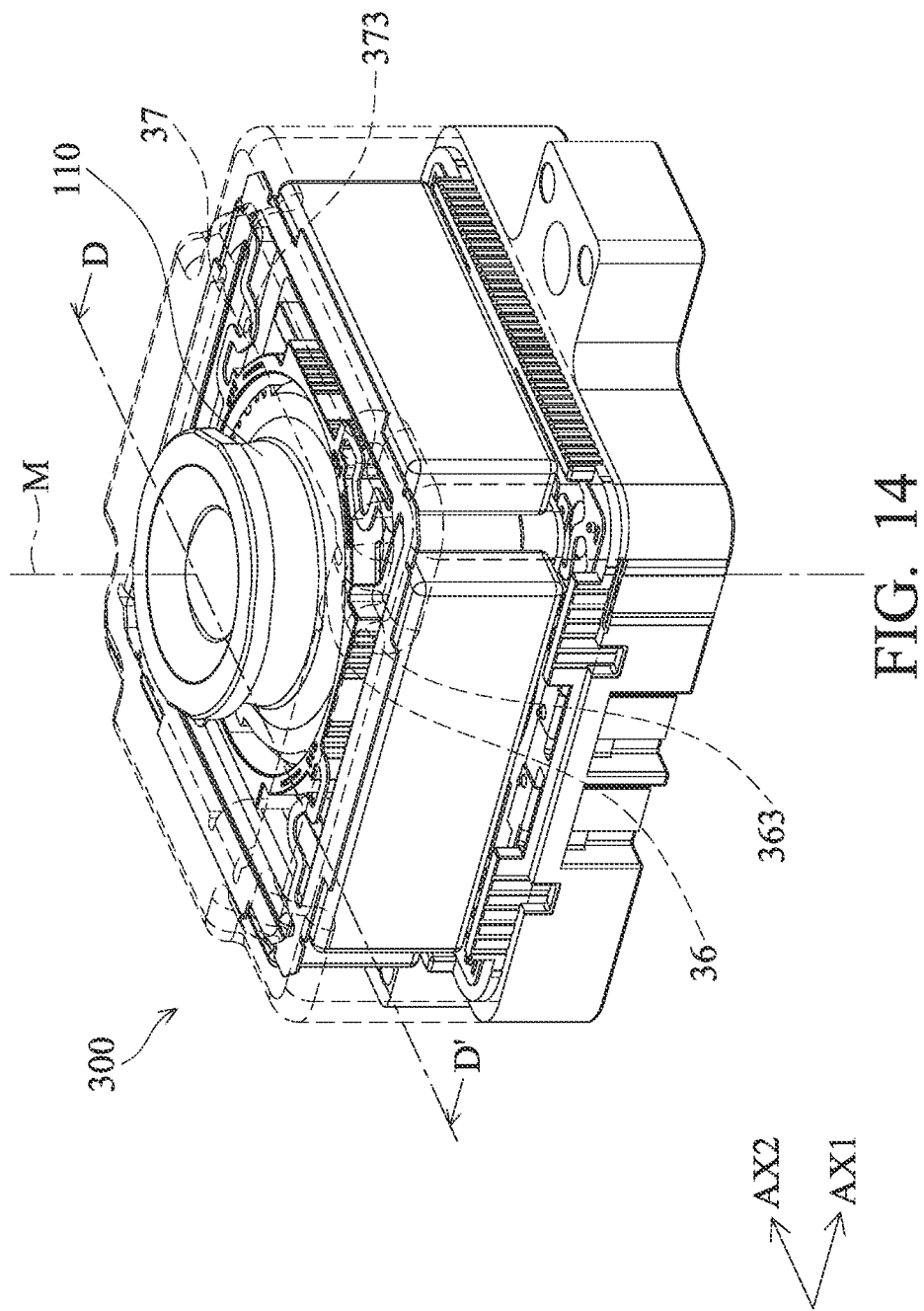
FIG. 14 is a schematic view of the optical element driving mechanism according to some embodiments of the present disclosure, in which the outer frame is shown as a dashed line.
Figure 15:
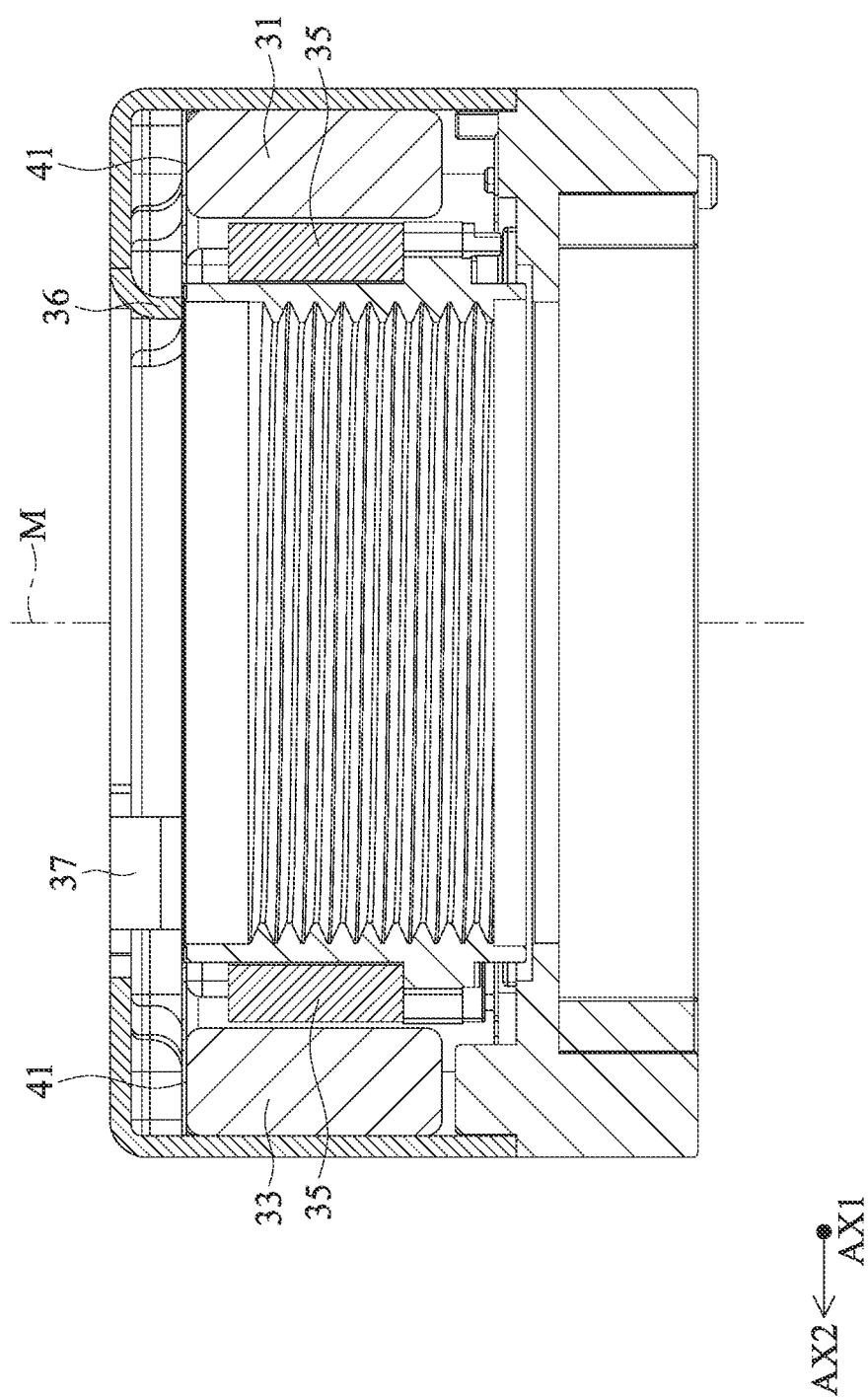
FIG. 15 is a cross-sectional view of the optical element driving mechanism along line D-D' of FIG. 14, according to some embodiments of the present disclosure.

Please refer to FIG. 14 and FIG. 15. FIG. 14 is a schematic view of the optical element driving mechanism 300 according to some embodiments of the present disclosure, in which the outer frame 11 is shown as a dashed line; FIG. 15 is a cross-sectional view of the optical element driving mechanism 300 along line D-D' of FIG. 14, according to some embodiments of the present disclosure;

The elements and arrangements of the optical element driving mechanism 300 are substantially the same as that of the optical element driving mechanism 100, the similar part will not be repeated herein.

The main difference between the optical element driving mechanism 300 and the optical element driving mechanism 100 is that the first reinforcement element 36 of the optical element driving mechanism 300 does not have a second reinforcement portion, and the second reinforcement element 37 of the optical element driving mechanism 300 does not have a fourth reinforcement portion.

According to some embodiments of the present disclosure, the first reinforcement element 36 and the second reinforcement element 37 of the optical element driving mechanism 300 may have an elongated shape.

The first reinforcement portion of the first reinforcement element 36 of the optical element driving mechanism 300 may be connected to the first outer frame top wall 111 via the first connection portion 363. The first connection portion 363 may have a plate-like structure, and the first connection portion 363 may be perpendicular to the second axis AX2.

According to some embodiments of the present disclosure, the second reinforcement element 37 of the optical element driving mechanism 300 may be connected to the first outer frame top wall 111 via the second connection portion 373. According to some embodiments of the present disclosure, the second connection portion 373 of the optical element driving mechanism 300 may have a plate-like structure and be perpendicular to the first axis AX1.

In this way, the elements of the optical element driving mechanism 300 may be effectively simplified, thereby making the optical element driving mechanism 300 easier to manufacture, and the manufacturing cost of the optical element driving mechanism 300 may be reduced.

In general, the optical element driving mechanism provided by the present disclosure may enhance the driving force generated by the driving assembly, thereby requiring a smaller current when driving the elements of the optical element mechanism, and a heavier element may also be driven. Furthermore, the optical element driving mechanism provided by the present disclosure may achieve the effect of miniaturization and may simplify the manufacture of the optical element driving mechanism. In addition, the optical element driving mechanism provided by the present disclosure may be easily connected with external elements, and has good stability and reliability.

Although embodiments of the present disclosure and their advantages have been described in detail, it should be understood that various changes, substitutions and alterations may be made herein without departing from the spirit and scope of the present disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the present disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. In addition, the scope of the present disclosure is defined by the scope of the appended claims. In addition, each scope of the claims is constructed as a separate embodiment, and various combinations of the claims and combinations of embodiments are within the scope of the present disclosure.

What is claimed is:

1. An optical element driving mechanism, comprising:
   a movable part, for connecting an optical element;
   a fixed part, wherein the movable part is movable relative to the fixed part; and
   a driving assembly, for generating a driving force to drive the movable part to move relative to the fixed part,
   wherein the driving assembly further comprises a first reinforcement element, for strengthening the driving force,
   wherein the driving assembly further comprises:
   a driving coil, movable relative to the first reinforcement element;
   a first magnetic element, corresponding to the driving coil and fixed relative to the first reinforcement element,
   wherein the first reinforcement element comprises a magnetically conductive material,
   wherein a first magnetic element surface of the first magnetic element has a planar structure and faces the driving coil,
   wherein a first reinforcement portion of the first magnetic element has a plate-like structure and is parallel to the first magnetic element surface,
   wherein the driving coil is located between the first magnetic element and the first reinforcement portion when viewed along a first axis that is parallel to the first magnetic element surface,
   wherein the driving coil at least partially overlaps the first magnetic element and the first reinforcement portion when viewed along a second axis that is perpendicular to the first magnetic element surface,
   wherein a main axis, the first axis and the second axis overlap each other,
   wherein when viewed along the main axis, the optical element driving mechanism having a polygonal structure comprises:
   a first side, parallel to the first axis;
   a second side, parallel to the second axis; and
   a first corner, located between the first side and the second side,
   wherein the first reinforcement element is located at the first corner when viewed along the main axis.

2. The optical element driving mechanism as claimed in claim 1, wherein the fixed part comprises an outer frame, and the outer frame comprises:
   a first outer frame top wall, having a plate-like structure and perpendicular to the main axis; and
   an outer frame sidewall, having a plate-like structure and not parallel to the first outer frame top wall,
   wherein the first reinforcement element and the outer frame have an integrally formed structure,
   wherein the first magnetic element is located on the first side when viewed along the main axis,
   wherein the first magnetic element surface is perpendicular to the second axis.

3. The optical element driving mechanism as claimed in claim 2, wherein the outer frame further comprises:
   an outer frame opening, formed on the first outer frame top wall, for allowing a light to pass through; and
   a second outer frame top wall, having a plate-like structure and being parallel to the main axis,
   wherein in the main axis, there is a non-zero distance between a first top surface of the first outer frame top wall and a second top surface of the second outer frame top wall, wherein the first top surface and the second top surface face the same direction, wherein the first top surface closely surrounds the outer frame opening, wherein the second top surface closely surrounds the outer frame opening.

4. The optical element driving mechanism as claimed in claim 3, wherein the driving assembly further comprises:
a second magnetic element, having a second magnetic element surface facing the movable part,
wherein the second magnetic element surface is perpendicular to the first axis,
wherein a second reinforcement portion of the first reinforcement element corresponds to the second magnetic element,
wherein the second reinforcement portion has a plate-like structure and is parallel to the second magnetic element surface,
wherein the first reinforcement element has a first connection portion that is connected to the first outer frame top wall, the first reinforcement portion, and the second reinforcement portion,
wherein the first reinforcement portion protrudes from the first connection portion,
wherein the second reinforcement portion protrudes from the first connection portion,
wherein the first reinforcement portion and the second reinforcement portion are not parallel to each other,
wherein a first reinforcement portion surface of the first reinforcement portion has a planar structure and is neither parallel nor perpendicular to the main axis,
wherein the first connection portion has a plate-like structure and is not parallel to the first axis or the second axis.

5. The optical element driving mechanism as claimed in claim 4, wherein the first reinforcement portion and the second reinforcement portion at least partially overlap in the second axis.

6. The optical element driving mechanism as claimed in claim 4, wherein the driving assembly further comprises a second reinforcement element corresponding to the second magnetic element,
wherein a third reinforcement portion of the second reinforcement element corresponds to the second magnetic element,
wherein a fourth reinforcement portion of the second reinforcement element corresponds to a third magnetic element of the driving assembly,
wherein the third reinforcement portion has a plate-like structure and is parallel to the second magnetic element surface,
wherein the second reinforcement element is located at a second corner of the optical element driving mechanism, and the second side is located between the first corner and the second corner when viewed along the main axis.

7. The optical element driving mechanism as claimed in claim 3, wherein the movable part further comprises:
a movable part body;
a movable part accommodation, having a recessed structure for accommodating the first reinforcement element; and
a driving assembly fixing structure, extending outwardly from the movable part body along a direction that is perpendicular to the main axis,
wherein the driving coil is fixedly arranged on the driving assembly fixing structure,
wherein the movable part accommodation is formed by recessing the movable part body,
wherein a first movable part body surface of the movable part body, a second movable part body surface of the movable part body, a first driving coil surface of the driving coil, a second driving coil surface of the driving coil, and the movable part body form the movable part accommodating part,
wherein the first movable part body surface, the second movable part body surface, the first driving coil surface and the second driving coil surface are parallel to the main axis,
wherein the first movable part body surface and the first driving coil surface face each other and are parallel to each other,
wherein the second movable part body surface and the second driving coil surface face each other and are parallel to each other.

8. The optical element driving mechanism as claimed in claim 2, wherein the first reinforcement element further comprises a first connection portion, and the first reinforcement portion is connected to the first outer frame top wall via the first connection portion,
wherein the first connection portion has a plate-like structure and is perpendicular to the second axis.

9. The optical element driving mechanism as claimed in claim 8, wherein the driving assembly further comprises:
a second magnetic element, having a second magnetic element surface facing the movable part, wherein the second magnetic element surface is perpendicular to the first axis; and
a second reinforcement element, corresponding to the second magnetic element,
wherein the second reinforcement element comprises a second connection portion, and the second reinforcement portion is connected to the first outer frame top wall via the second connection portion,
wherein the second connection portion has a plate-like structure and is perpendicular to the first axis,
wherein the second reinforcement element is located at a second corner of the optical element when viewed along the main axis.

10. The optical element driving mechanism as claimed in claim 9, wherein the movable part further comprises:
a movable part body;
a movable part accommodation, having a recessed structure for accommodating the first reinforcement element; and
a driving assembly fixing structure, extending outwardly from the movable part body along a direction that is perpendicular to the main axis,
wherein the driving coil is fixedly arranged on the driving assembly fixing structure,
wherein the movable part accommodation is formed by recessing the movable part body,
wherein a first movable part body surface of the movable part body, a second movable part body surface of the movable part body, a first driving coil surface of the driving coil, a second driving coil surface of the driving coil, and the movable part body form the movable part accommodating part,
wherein the first movable part body surface, the second movable part body surface, the first driving coil surface and the second driving coil surface are parallel to the main axis, wherein the first movable part body surface and the first driving coil surface face each other and are parallel to each other, wherein the shortest distance between the first reinforcement element and the first movable part body surface is shorter than the shortest distance between the first reinforcement element and the first driving coil surface.

11. The optical element driving mechanism as claimed in claim 7, further comprising an elastic assembly, for connecting the movable part to the fixed part, wherein the elastic assembly comprises a first elastic element, and the first elastic element comprises:
  a first elastic element outer portion, connected to the fixed part;
  a first elastic element inner portion, connected to the movable part; and
  a first elastic element extension, connecting the first elastic element outer portion and the first elastic element inner portion,
  wherein the first reinforcement element and the first elastic element at least partially overlap when viewed along the first axis.

12. The optical element driving mechanism as claimed in claim 11, wherein the first reinforcement element and the first elastic element at least partially overlap when viewed along the second axis.

13. The optical element driving mechanism as claimed in claim 11, wherein in the first axis, the shortest distance between the first driving coil surface and the first reinforcement element is shorter than the shortest distance between the first elastic element extension and the first reinforcement element.

14. The optical element driving mechanism as claimed in claim 11, wherein in the second axis, the shortest distance between the second movable part body surface and the first reinforcement element is shorter than the shortest distance between the first elastic element extension and the first reinforcement element.

15. The optical element driving mechanism as claimed in claim 11, wherein in the first axis, the shortest distance between the first movable part body surface and the first reinforcement element is shorter than the shortest distance between the first elastic element inner portion and the first reinforcement element.

16. The optical element driving mechanism as claimed in claim 11, wherein in the second axis, the shortest distance between the second movable part body surface and the first reinforcement element is shorter than the shortest distance between the first elastic element inner portion and the first reinforcement element.

17. The optical element driving mechanism as claimed in claim 11, wherein the movable part body further comprises a third movable part body surface, and there is a gap between the third movable part body surface and the second driving coil surface.

18. The optical element driving mechanism as claimed in claim 17, wherein the shortest distance between the third movable part body surface and the second driving coil surface is shorter than the shortest distance between the first reinforcement element and the second driving coil surface.

19. The optical element driving mechanism as claimed in claim 17, wherein the shortest distance between the third movable part body surface and the first driving coil surface is shorter than the shortest distance between the first reinforcement element and the first driving coil surface.

* * * * *